US011491731B2

(12) United States Patent
Takahashi

(10) Patent No.: US 11,491,731 B2
(45) Date of Patent: Nov. 8, 2022

(54) METHOD FOR PRODUCING THREE-DIMENSIONAL SHAPED ARTICLE, THREE-DIMENSIONAL SHAPING APPARATUS, AND THREE-DIMENSIONAL SHAPING SYSTEM

(71) Applicant: SEIKO EPSON CORPORATION, Tokyo (JP)

(72) Inventor: Eizo Takahashi, Asahi-mura (JP)

(73) Assignee: Seiko Epson Corporation, Tokyo (JP)

(*) Notice: Subject to any disclaimer, the term of this patent is extended or adjusted under 35 U.S.C. 154(b) by 353 days.

(21) Appl. No.: 16/795,656

(22) Filed: Feb. 20, 2020

(65) Prior Publication Data

US 2020/0269515 A1 Aug. 27, 2020

(30) Foreign Application Priority Data

Feb. 22, 2019 (JP) .............................. JP2019-030091

(51) Int. Cl.
*B29C 64/393* (2017.01)
*B29C 64/209* (2017.01)
*B29C 64/106* (2017.01)
*B33Y 50/02* (2015.01)
*B33Y 10/00* (2015.01)

(52) U.S. Cl.
CPC .......... *B29C 64/393* (2017.08); *B29C 64/106* (2017.08); *B29C 64/209* (2017.08); *B33Y 10/00* (2014.12); *B33Y 50/02* (2014.12)

(58) Field of Classification Search
CPC ... B29C 64/393; B29C 64/209; B29C 64/106; B29C 64/357; B33Y 50/02

USPC ......................................................... 700/98
See application file for complete search history.

(56) References Cited

U.S. PATENT DOCUMENTS

| 10,751,951 | B1* | 8/2020 | Nguyen | B29C 64/182 |
| 2016/0151981 | A1 | 6/2016 | Nomura | |
| 2016/0260001 | A1* | 9/2016 | Flores | G06K 1/121 |
| 2020/0001536 | A1* | 1/2020 | DeSimone | B29C 64/188 |
| 2021/0170690 | A1* | 6/2021 | Gupta | G06K 19/06028 |

FOREIGN PATENT DOCUMENTS

| JP | 2006-192710 A | 7/2006 |
| JP | 2016-104550 A | 6/2016 |

* cited by examiner

*Primary Examiner* — Matthew J Daniels
*Assistant Examiner* — Gregory C. Grosso
(74) *Attorney, Agent, or Firm* — Global IP Counselors, LLP

(57) ABSTRACT

A method for producing a three-dimensional shaped article includes acquiring first shape data for indicating a shape of the three-dimensional shaped article, and identification information for identifying the three-dimensional shaped article, generating second shape data for indicating the shape of the three-dimensional shaped article representing the identification information by an arrangement of layers having different characteristics using the first shape data and the identification information, producing the three-dimensional shaped article according to the second shape data, and transmitting the identification information and production information of the three-dimensional shaped article to a server.

4 Claims, 17 Drawing Sheets

FIG. 11

| SERIAL NO. | PRODUCTION DATE | PRODUCTION SITE | GENERATION | MATERIAL | ... |
|---|---|---|---|---|---|
| ABC12345 | 20XX-XX-XX | Plant A | Gen1 | >ABS< | ... |
| ABC12346 | 20XX-XX-XX | Plant A | Gen1 | >ABS< | ... |
| ABC12347 | 20XX-XX-XX | Plant A | Gen1 | >ABS< | ... |
| ... | ... | ... | ... | ... | ... |
| ABC23456 | 20YY-YY-YY | Plant B | Gen2 | >ABS(REC)< DR | ... |
| ABC12345 | 20XX-XX-XX | Plant A | Gen1 | >ABS< | ... |
| ABC12346 | 20XX-XX-XX | Plant A | Gen1 | >ABS< | ... |
| ... | ... | ... | ... | ... | ... |
| ABC34567 | 20ZZ-ZZ-ZZ | Plant A | Gen3 | >ABS(REC)< DR | ... |
| ABC23456 | 20YY-YY-YY | Plant B | Gen2 | >ABS(REC)< DR | ... |
| ABC12345 | 20XX-XX-XX | Plant A | Gen1 | >ABS< | ... |
| ABC12346 | 20XX-XX-XX | Plant A | Gen1 | >ABS< | ... |
| ABC23999 | 20XY-XY-XY | Plant C | Gen2 | >ABS(REC)< DR | ... |

METHOD FOR PRODUCING THREE-DIMENSIONAL SHAPED ARTICLE, THREE-DIMENSIONAL SHAPING APPARATUS, AND THREE-DIMENSIONAL SHAPING SYSTEM

The present application is based on, and claims priority from JP Application Serial Number 2019-030091, filed on Feb. 22, 2019, the disclosure of which is hereby incorporated by reference herein in its entirety.

BACKGROUND

1. Technical Field

The present disclosure relates to a method for producing a three-dimensional shaped article, a three-dimensional shaping apparatus, and a three-dimensional shaping system.

2. Related Art

For example, JP-A-2016-104550 (Patent Document 1) discloses a technique in which in a shaped article obtained by stacking a plurality of layers, the identification information of an apparatus for producing the shaped article is indicated inside the shaped article by making the characteristic amounts of adjacent layers different.

When a three-dimensional shaped article is recycled, it is preferred that various types of production information such as production date, manufacturer, and materials used in production can be acquired from the three-dimensional shaped article. However, in the technique described in Patent Document 1, the amount of information that can be indicated in the three-dimensional shaped article is limited by the number of layers.

SUMMARY

An object of the present application is to make various types of information regarding a three-dimensional shaped article acquirable using the three-dimensional shaped article.

According to an aspect of the present disclosure, a method for producing a three-dimensional shaped article is provided. This method for producing a three-dimensional shaped article includes acquiring first shape data for indicating a shape of the three-dimensional shaped article, and identification information for identifying the three-dimensional shaped article, generating second shape data for indicating the shape of the three-dimensional shaped article representing the identification information by an arrangement of layers having different characteristics using the first shape data and the identification information, producing the three-dimensional shaped article according to the second shape data, and transmitting the identification information and production information of the three-dimensional shaped article to a server.

BRIEF DESCRIPTION OF THE DRAWINGS

FIG. 11 is an explanatory view showing one example of history data managed by a server.

DESCRIPTION OF EXEMPLARY EMBODIMENTS

A. First Embodiment

Figure 1:
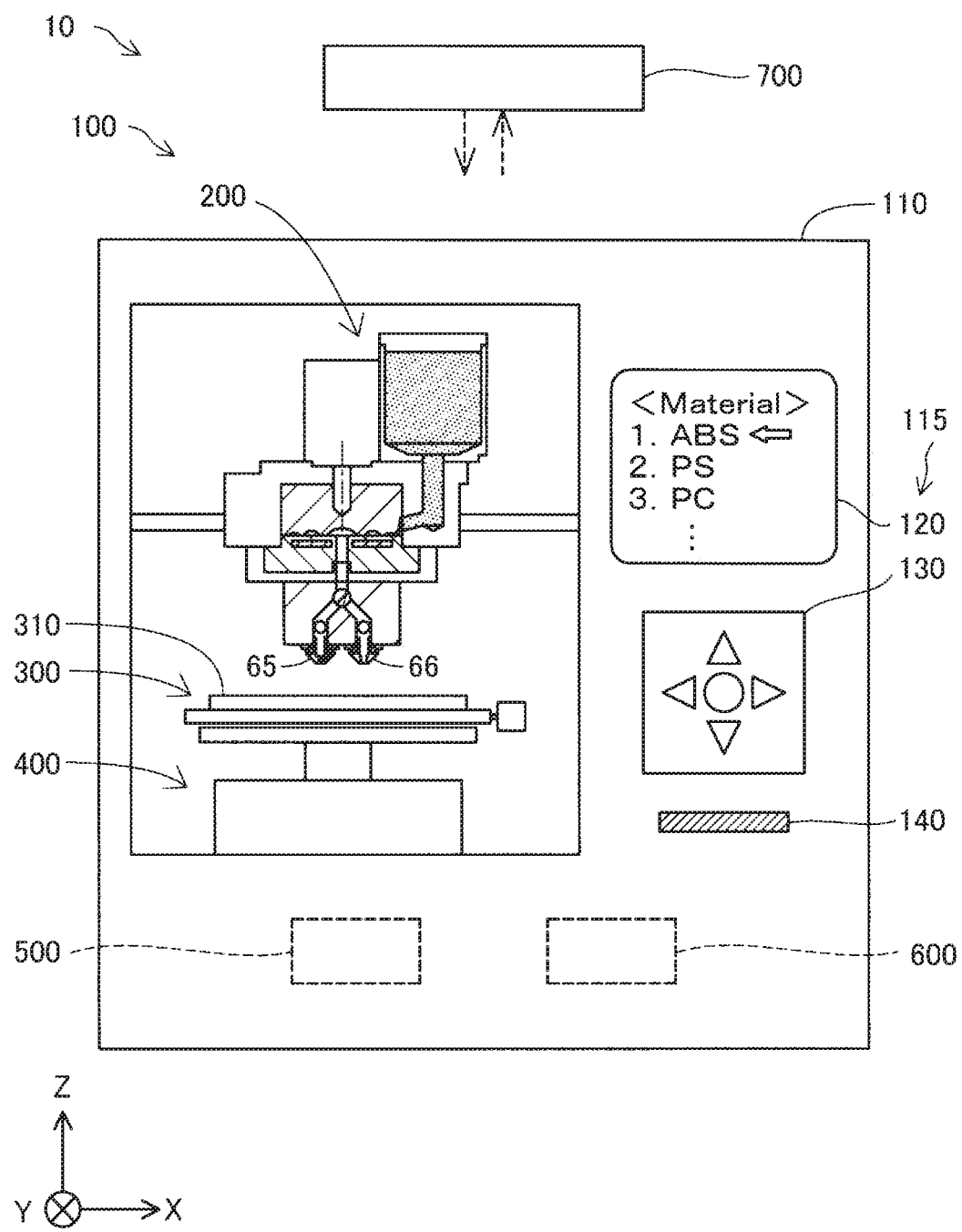
FIG. 1 is an explanatory view showing a schematic configuration of a three-dimensional shaping system in a first embodiment.

FIG. 1 is an explanatory view showing a schematic configuration of a three-dimensional shaping system 10 in a first embodiment. In FIG. 1, arrows along the X, Y, and Z directions orthogonal to one another are shown. The X direction and the Y direction are directions along the horizontal direction, and the Z direction is a direction along the vertical direction. In also the other drawings, arrows along the X, Y, and Z directions are shown as appropriate. The X, Y, and Z directions in FIG. 1 and the X, Y, and Z directions in the other drawings indicate the same directions.

The three-dimensional shaping system 10 in this embodiment includes a three-dimensional shaping apparatus 100 for producing a three-dimensional shaped article, and a server 700 for managing information regarding the produced three-dimensional shaped article. The three-dimensional shaping apparatus 100 in this embodiment includes an ejection unit 200, a shaping stage 300, a moving mechanism 400, a controller 500, and a data processing portion 600. The ejection unit 200, the shaping stage 300, the moving mechanism 400, the controller 500, and the data processing portion 600 are housed in a casing 110. The casing 110 is provided with an operation panel 115 and a reading portion 140. Note that the shaping stage 300 is sometimes simply referred to as "stage".

In this embodiment, the operation panel 115 is constituted by a display portion 120 and an operation portion 130. In the display portion 120, various information regarding the three-dimensional shaping apparatus 100 is displayed. The display portion 120 in this embodiment is constituted by a liquid crystal display. The operation portion 130 is constituted by a button for operating the three-dimensional shaping apparatus 100. The display portion 120 and the operation portion 130 may be constituted as one body by constituting the display portion 120 by a touch panel.

In this embodiment, the reading portion 140 is provided below the operation panel 115 in the casing 110. In this embodiment, the reading portion 140 includes a camera and is configured to be able to read various information by analyzing an image captured by the camera. The reading portion 140 can, for example, capture an image of a barcode or a two-dimensional code by the camera and read the barcode or the two-dimensional code in the captured image.

The three-dimensional shaping apparatus 100 produces a three-dimensional shaped article having a desired shape on the shaping stage 300 by driving the moving mechanism 400 so as to change the relative position of a first nozzle 65 or a second nozzle 66 provided in the ejection unit 200 and the shaping stage 300 while ejecting the shaping material toward the shaping stage 300 from the first nozzle 65 or the second nozzle 66 under the control of the controller 500. In this embodiment, the controller 500 produces the three-dimensional shaped article while switching between ejection of the shaping material from the first nozzle 65 and ejection of the shaping material from the second nozzle 66. A detailed configuration of the ejection unit 200 will be described later with reference to FIG. 2.

The shaping stage 300 has a shaping face 310 opposed to the first nozzle 65 and the second nozzle 66. On the shaping face 310, the shaping material ejected from the first nozzle 65 or the second nozzle 66 is stacked. In this embodiment, the shaping stage 300 is supported by the moving mechanism 400.

The moving mechanism 400 changes the relative position of the ejection unit 200 and the shaping stage 300. In this embodiment, the moving mechanism 400 moves the shaping stage 300 with respect to the ejection unit 200. The moving mechanism 400 in this embodiment is constituted by a three-axis positioner for moving the shaping stage 300 in three axis directions of the X, Y, and Z directions by driving forces of three motors. Each motor is driven under the control of the controller 500. The moving mechanism 400 may not be configured to move the shaping stage 300, but may be configured to move the ejection unit 200 without moving the shaping stage 300. The moving mechanism 400 may be configured to move both the ejection unit 200 and the shaping stage 300.

The controller 500 is constituted by a computer including one or more processors, a main storage device, and an input/output interface for performing signal input/output to/from the outside. In this embodiment, the controller 500 exhibits various functions by execution of a program or a command read on the main storage device by the processor.

The controller 500 may not be constituted by a computer, but may be constituted by a combination of a plurality of circuits.

The data processing portion 600 is constituted by a computer including one or more processors, a main storage device, and an input/output interface for performing signal input/output to/from the outside. In this embodiment, the data processing portion 600 exhibits various functions by execution of a program or a command read on the main storage device by the processor. The data processing portion 600 may be constituted as a part of the controller 500. A detailed configuration of the data processing portion 600 will be described later with reference to FIG. 10.

Figure 2:
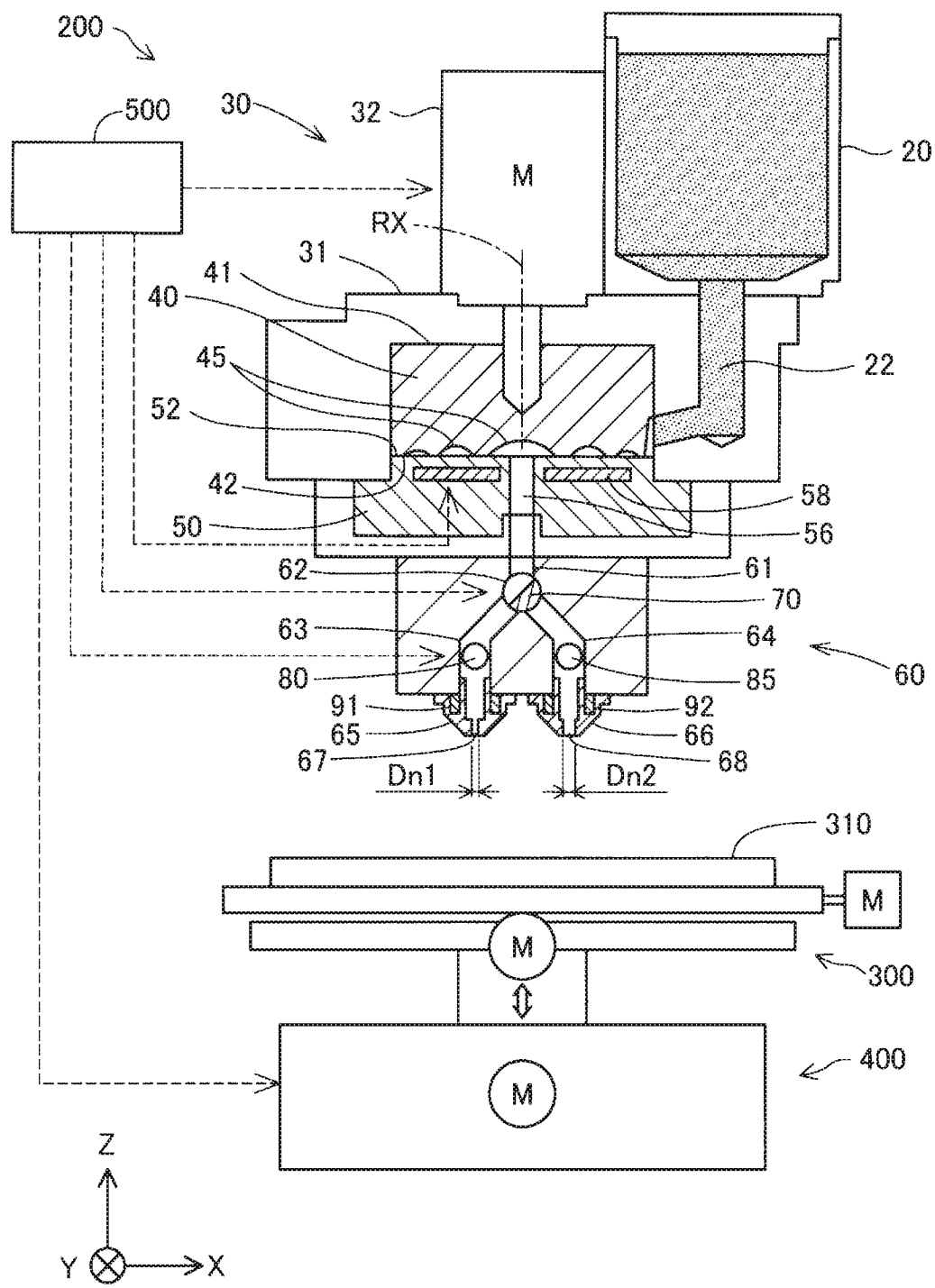
FIG. 2 is an explanatory view showing a schematic configuration of an ejection unit in the first embodiment.

FIG. 2 is an explanatory view showing a schematic configuration of the ejection unit 200 in this embodiment. The ejection unit 200 includes a material supply portion 20, a melting portion 30, and an ejection portion 60. The material supply portion 20 stores a material in a state of a pellet, a powder, or the like. The material in this embodiment is an ABS resin in a pellet form. The material supply portion 20 in this embodiment is constituted by a hopper. The material supply portion 20 and the melting portion 30 are coupled to each other through a supply path 22 provided below the material supply portion 20. The material fed to the material supply portion 20 is supplied to the melting portion 30 through the supply path 22.

The melting portion 30 includes a screw case 31, a driving motor 32, a flat screw 40, and a barrel 50. The melting portion 30 melts at least a part of the material in a solid state supplied from the material supply portion 20 to form a shaping material in a paste form having fluidity, and supplies the shaping material to the first nozzle 65 or the second nozzle 66. The flat screw 40 is sometimes simply referred to as "screw".

The screw case 31 houses the flat screw 40. To an upper face of the screw case 31, the driving motor 32 is fixed. The driving motor 32 is coupled to an upper face 41 of the flat screw 40.

The flat screw 40 has a substantially columnar shape whose height in a direction along a central axis RX is smaller than the diameter. The flat screw 40 is disposed in the screw case 31 so that the central axis RX becomes parallel to the Z direction. The flat screw 40 rotates around the central axis RX in the screw case 31 by a torque generated by the driving motor 32.

The flat screw 40 has a groove formed face 42 at an opposite side to the upper face 41 in a direction along the central axis RX. In the groove formed face 42, a groove portion 45 is formed. A detailed shape of the groove formed face 42 of the flat screw 40 will be described later with reference to FIG. 8.

The barrel 50 is provided below the flat screw 40. The barrel 50 has a screw opposed face 52 opposed to the groove formed face 42 of the flat screw 40. The barrel 50 has a built-in heater 58 at a position opposed to the groove portion 45 of the flat screw 40. The temperature of the heater 58 is controlled by the controller 500. The heater 58 is sometimes referred to as "heating portion".

At the center of the screw opposed face 52, a communication hole 56 is provided. The communication hole 56 communicates with the ejection portion 60. A detailed shape of the screw opposed face 52 of the barrel 50 will be described later with reference to FIG. 9.

The ejection portion 60 communicates with the communication hole 56 of the barrel 50, and includes a supply channel 61 through which the shaping material supplied from the melting portion 30 flows, a first branch channel 63 and a second branch channel 64 to which the shaping material is supplied from the supply channel 61, a coupling portion 62 coupling the supply channel 61, the first branch channel 63, and the second branch channel 64, the first nozzle 65 communicating with the first branch channel 63, the second nozzle 66 communicating with the second branch channel 64, and a valve mechanism 70 provided in the coupling portion 62. The shaping material supplied to the ejection portion 60 is ejected toward the shaping stage 300 from either one of the first nozzle 65 and the second nozzle 66. Whether the shaping material is ejected from the first nozzle 65 or ejected from the second nozzle 66 is switched by the valve mechanism 70.

An opening shape of a first nozzle hole 67 of the first nozzle 65 and an opening shape of a second nozzle hole 68 of the second nozzle 66 are different. The first nozzle hole 67 is an opening portion provided at an end portion at a side communicating with the atmosphere in the first nozzle 65. The second nozzle hole 68 is an opening portion provided at an end portion at a side communicating with the atmosphere in the second nozzle 66. The configuration in which the opening shapes are different means that at least either the shape of the opening portion or the size of the opening portion is different. For example, when the first nozzle hole 67 and the second nozzle hole 68 both have a circular shape, and a nozzle diameter Dn1 of the first nozzle hole 67 and a nozzle diameter Dn2 of the second nozzle hole 68 are different, the opening shape of the first nozzle hole 67 and the opening shape of the second nozzle hole 68 are different. Further, when, for example, the first nozzle hole 67 has a circular shape and the second nozzle hole 68 has a quadrangular shape or the like even if an opening area of the first nozzle hole 67 and an opening area of the second nozzle hole 68 are the same, the opening shape of the first nozzle hole 67 and the opening shape of the second nozzle hole 68 are different. In this embodiment, the first nozzle hole 67 and the second nozzle hole 68 both have a circular shape. The nozzle diameter Dn2 of the second nozzle 66 is larger than the nozzle diameter Dn1 of the first nozzle 65. Note that the nozzle diameter Dn1 of the first nozzle 65 is the smallest diameter of the first nozzle hole 67, and the nozzle diameter Dn2 of the second nozzle 66 is the smallest diameter of the second nozzle hole 68. The shape of the first nozzle hole 67 and the second nozzle hole 68 is not limited to a circular shape, and may be a quadrangular shape or the like.

In this embodiment, in the ejection portion 60, a first nozzle heater 91 for heating the first nozzle 65 and a second nozzle heater 92 for heating the second nozzle 66 are provided. On/off of the first nozzle heater 91 and the second nozzle heater 92 for heating is switched by the controller 500. By heating the first nozzle 65 using the first nozzle heater 91, the fluidity of the shaping material in the first nozzle 65 can be increased. By heating the second nozzle 66 using the second nozzle heater 92, the fluidity of the shaping material in the second nozzle 66 can be increased.

In this embodiment, in the ejection portion 60, a first suction portion 80 coupled to the first branch channel 63 and a second suction portion 85 coupled to the second branch channel 64 are provided. The first suction portion 80 is configured to be able to suck the shaping material in the first branch channel 63. The second suction portion 85 is configured to be able to suck the shaping material in the second branch channel 64. Specific configuration of the first suction portion 80 and the second suction portion 85 will be described later with reference to FIG. 7.

Figure 3:
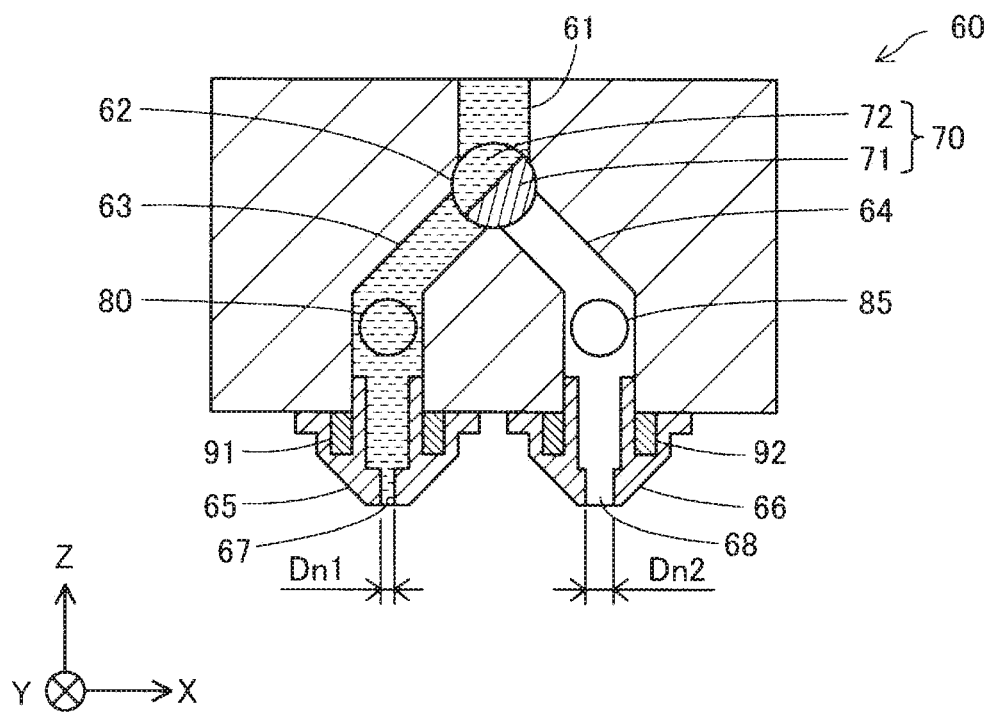
FIG. 3 is a cross-sectional schematic view showing a schematic configuration of a valve mechanism in a first state.
Figure 4:
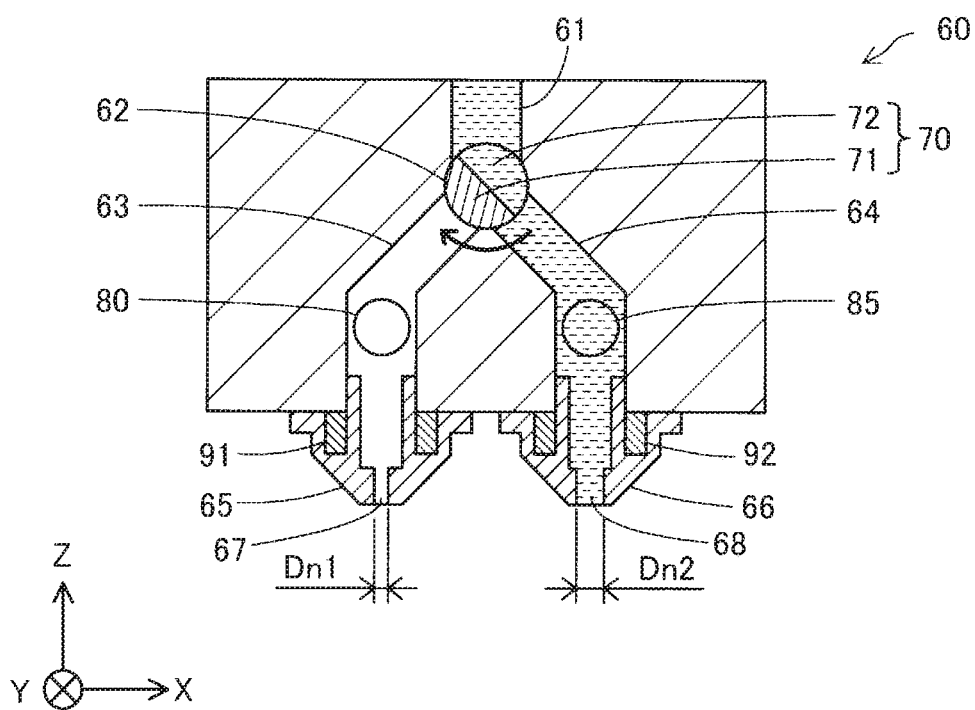
FIG. 4 is a cross-sectional schematic view showing a schematic configuration of the valve mechanism in a second state.
Figure 5:
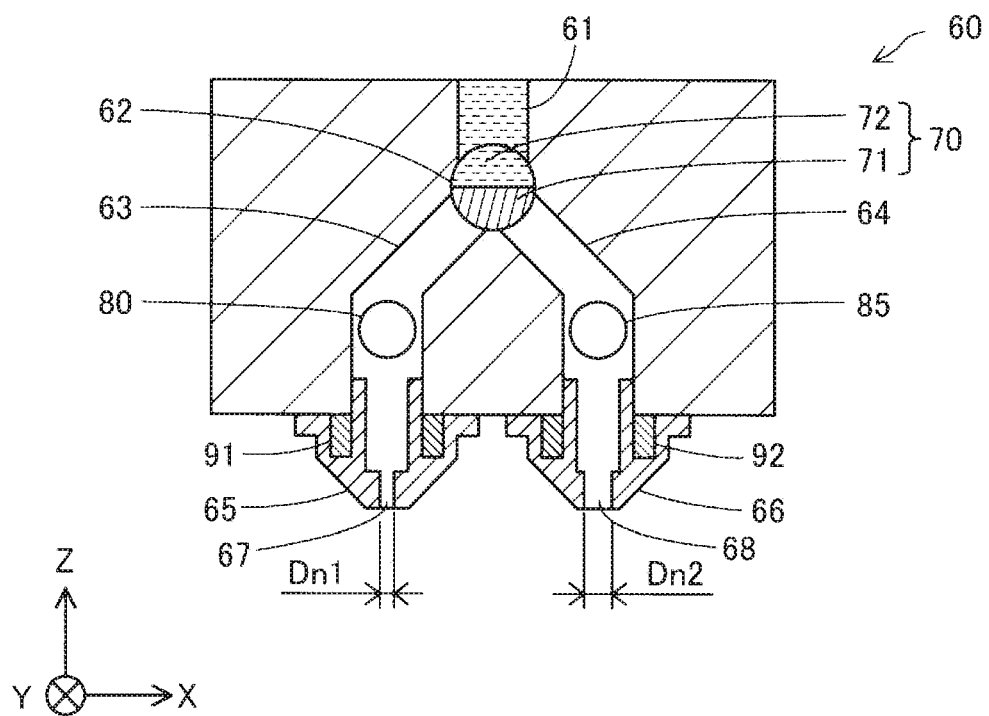
FIG. 5 is a cross-sectional schematic view showing a schematic configuration of the valve mechanism in a third state.

FIG. 3 is a cross-sectional schematic view showing a schematic configuration of the valve mechanism 70 in a first state. FIG. 4 is a cross-sectional schematic view showing a schematic configuration of the valve mechanism 70 in a second state. FIG. 5 is a cross-sectional schematic view showing a schematic configuration of the valve mechanism 70 in a third state. The first state means a state of the ejection unit 200 in which the supply channel 61 and the first branch channel 63 communicate with each other, and also the supply channel 61 and the second branch channel 64 are shut off from each other. The second state means a state of the ejection unit 200 in which the supply channel 61 and the second branch channel 64 communicate with each other, and also the supply channel 61 and the first branch channel 63 are shut off from each other. The third state means a state of the ejection unit 200 in which the supply channel 61 and the first branch channel 63 are shut off from each other, and also the supply channel 61 and the second branch channel 64 are shut off from each other.

The valve mechanism 70 is a valve configured to be switchable among the first state, the second state, and the third state. The valve mechanism 70 is configured to be rotatable in the coupling portion 62 and includes a valve portion 71 having a flow path 72 through which the shaping material can flow. In accordance with the rotation of the valve portion 71, either one of the first branch channel 63 and the second branch channel 64 communicates with the supply channel 61 through the flow path 72, and the other one is shut off from the supply channel 61 by the valve portion 71, whereby the state is switched to the first state or the second state. Further, by the valve portion 71, the supply channel 61 and the first branch channel 63 are shut off from each other, and also the supply channel 61 and the second branch channel 64 are shut off from each other, whereby the state is switched to the third state. Further, the valve mechanism 70 of this embodiment adjusts a rotation angle of the valve portion 71, whereby a first flow rate of the shaping material flowing in the first branch channel 63 in the first state and a second flow rate of the shaping material flowing in the second branch channel 64 in the second state are adjusted.

Figure 6:
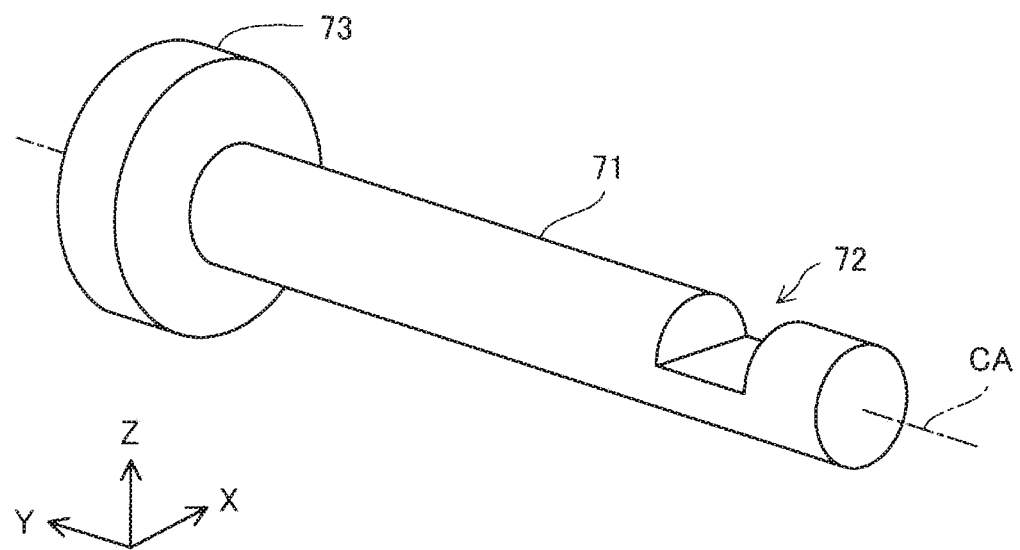
FIG. 6 is a perspective view showing a schematic configuration of a valve portion in the first embodiment.

FIG. 6 is a perspective view showing the valve portion 71 of this embodiment. The valve portion 71 of this embodiment has a columnar shape with a central axis CA. The flow path 72 is provided by cutting out a portion of a side face of the valve portion 71. At one end portion of the valve portion 71, a torque input portion 73 is provided. To the torque input portion 73, a motor driven under the control of the controller 500 is coupled. By applying a torque generated by the motor to the torque input portion 73, the valve portion 71 rotates.

Figure 7:
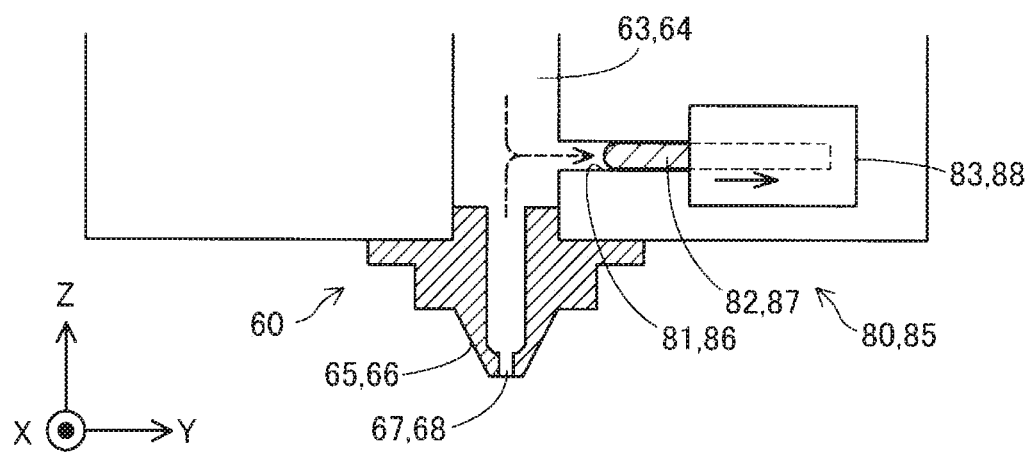
FIG. 7 is an explanatory view showing a schematic configuration of a suction portion in the first embodiment.

FIG. 7 is an explanatory view showing a schematic configuration of the first suction portion 80. In this embodiment, the first suction portion 80 includes a first cylinder 81 having a cylindrical shape coupled to the first branch channel 63, a first plunger 82 housed in the first cylinder 81, and a first plunger driving portion 83 driving the first plunger 82. In this embodiment, the first plunger driving portion 83 is constituted by a motor driven under the control of the controller 500, and a rack and pinion converting the rotation of the motor into movement in a translation direction along the axial direction of the first cylinder 81. The first plunger driving portion 83 may be constituted by a motor driven under the control of the controller 500, and a ball screw converting the rotation of the motor into movement in a translation direction along the axial direction of the first cylinder 81, or may be constituted by an actuator such as a solenoid mechanism or a piezo element.

As shown using the arrows in FIG. 7, when the first plunger 82 moves in a direction away from the first branch channel 63, the pressure inside the first cylinder 81 becomes negative, and therefore, the shaping material from the first branch channel 63 to the first nozzle 65 is sucked inside the first cylinder 81. On the other hand, when the first plunger 82 moves in a direction approaching the first branch channel 63, the shaping material in the first cylinder 81 is pushed out to the first branch channel 63 by the first plunger 82.

The second suction portion 85 includes a second cylinder 86 having a cylindrical shape coupled to the second branch channel 64, a second plunger 87 housed in the second cylinder 86, and a second plunger driving portion 88 driving the second plunger 87. The configuration and operation of the second suction portion 85 are the same as those of the first suction portion 80, and therefore, the explanation thereof will be omitted.

Figure 8:
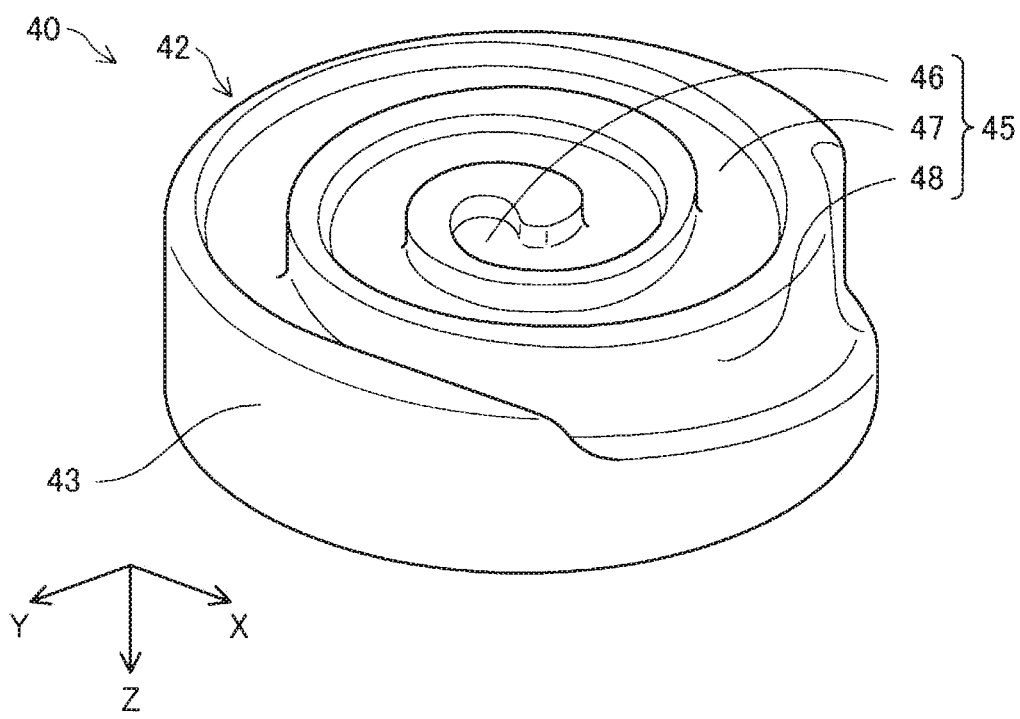
FIG. 8 is a perspective view showing a configuration of a groove formed face of a flat screw in the first embodiment.

FIG. 8 is a perspective view showing a configuration of the groove formed face 42 of the flat screw 40 in this embodiment. The flat screw 40 shown in FIG. 8 is shown in a state where the vertical positional relationship shown in FIG. 2 is reversed for facilitating the understanding of the technique. In the groove formed face 42 of the flat screw 40, the groove portion 45 is formed as described above. The groove portion 45 includes a central portion 46, a spiral portion 47, and a material introduction portion 48.

The central portion 46 is a circular recess formed around the central axis RX of the flat screw 40. The central portion 46 is opposed to the communication hole 56 provided in the barrel 50.

The spiral portion 47 is a groove extending in a spiral shape so as to draw an arc toward the outer circumference of the groove formed face 42 with the central portion 46 as the center. The spiral portion 47 may be configured to extend in an involute curve shape or in a helical shape. One end of the spiral portion 47 is coupled to the central portion 46. The other end of the spiral portion 47 is coupled to the material introduction portion 48. In FIG. 8, a form in which a single streak of spiral portion 47 is provided in the flat screw 40 is shown, however, a plurality of streaks of spiral portions 47 may be provided in the flat screw 40.

The material introduction portion 48 is a groove wider than the spiral portion 47 provided at the outer circumferential edge of the groove formed face 42. The material introduction portion 48 is continuous up to a side face 43 of the flat screw 40. The material introduction portion 48 introduces the material supplied from the material supply portion 20 to the spiral portion 47 through the supply path 22.

Figure 9:
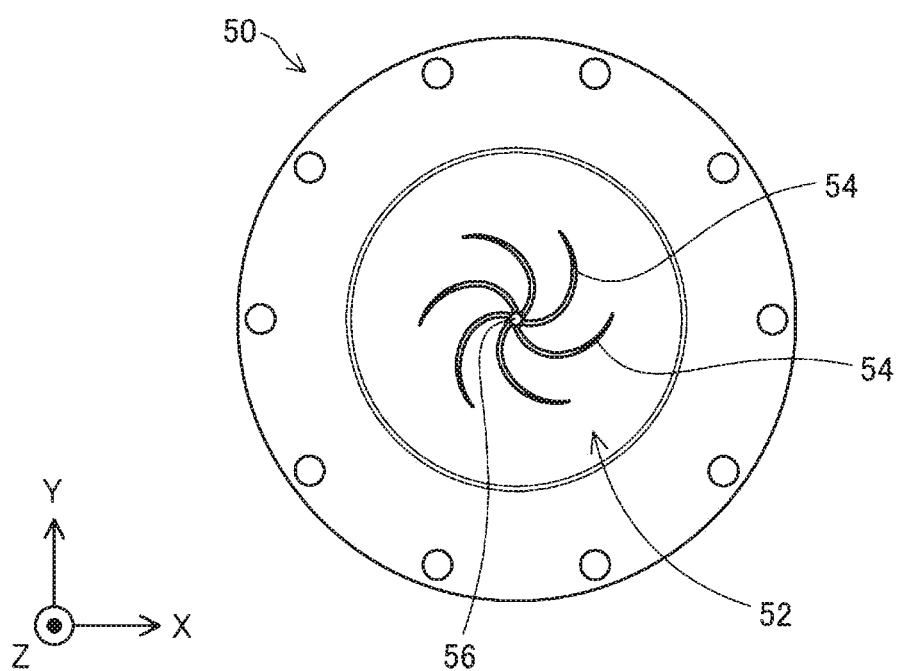
FIG. 9 is a top view showing a configuration of a screw opposed face of a barrel in the first embodiment.

FIG. 9 is a top view showing a configuration of the screw opposed face 52 of the barrel 50 in this embodiment. As described above, at the center of the screw opposed face 52, the communication hole 56 communicating with the supply channel 61 is formed. Around the communication hole 56 in the screw opposed face 52, a plurality of guide grooves 54 are formed. One end of each of the guide grooves 54 is coupled to the communication hole 56, and each guide groove 54 extends in a spiral shape toward the outer circumference of the screw opposed face 52 from the communication hole 56. Each guide groove 54 has a function of guiding the shaping material to the communication hole 56.

According to the configuration of the three-dimensional shaping apparatus 100 described above, the material stored in the material supply portion 20 passes through the supply path 22 and is supplied to the material introduction portion 48 from the side face 43 of the rotating flat screw 40. The material supplied into the material introduction portion 48 is conveyed into the spiral portion 47 by the rotation of the flat screw 40.

At least a part of the material conveyed into the spiral portion 47 is melted by the rotation of the flat screw 40 and heating by the built-in heater 58 in the barrel 50 to become the shaping material in a paste form having fluidity.

By the rotation of the flat screw 40, the shaping material is conveyed toward the central portion 46 in the spiral portion 47. The shaping material conveyed to the central portion 46 is sent out to the supply channel 61 from the communication hole 56. In the first state, the shaping material is supplied to the first nozzle 65 from the supply channel 61 through the first branch channel 63. The shaping material supplied to the first nozzle 65 is ejected toward the shaping stage 300 from the first nozzle hole 67. On the other hand, in the second state, the shaping material is supplied to the second nozzle 66 from the supply channel 61 through the second branch channel 64. The shaping material supplied to the second nozzle 66 is ejected toward the shaping stage 300 from the second nozzle hole 68.

Figure 10:
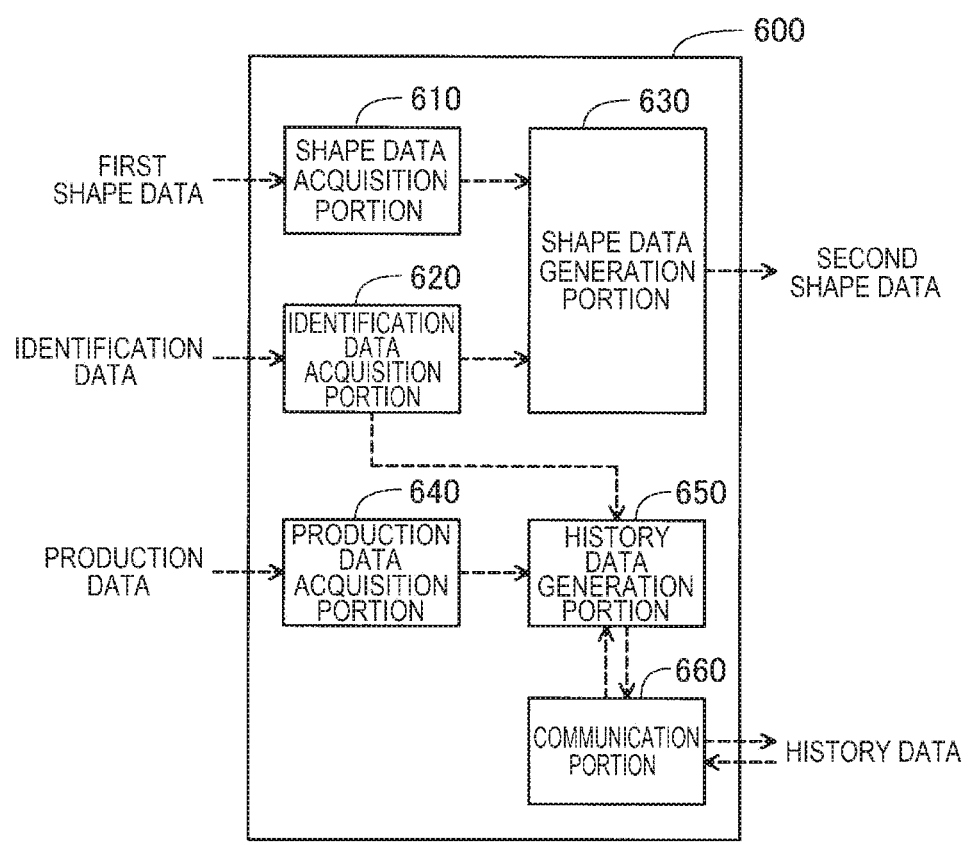
FIG. 10 is a block diagram showing a schematic configuration of a data processing portion in the first embodiment.

FIG. 10 is a block diagram showing a schematic configuration of the data processing portion 600. The data processing portion 600 includes a shape data acquisition portion 610, an identification data acquisition portion 620, a shape data generation portion 630, a production data acquisition portion 640, a history data generation portion 650, and a communication portion 660. The shape data acquisition portion 610 acquires first shape data representing a shape of a three-dimensional shaped article. The identification data acquisition portion 620 acquires identification data representing identification information for identifying one three-dimensional shaped article from a plurality of produced three-dimensional shaped articles. The identification information refers to, for example, a serial number or a lot number of the three-dimensional shaped article. The shape data generation portion 630 generates second shape data representing the shape of the three-dimensional shaped article including a shape indicating the identification information inside using the first shape data acquired through the shape data acquisition portion 610, and the identification data acquired through the identification data acquisition portion 620.

The production data acquisition portion 640 acquires production data representing production information of the produced three-dimensional shaped article. The production information is information representing the production date or the production site of the three-dimensional shaped article, a material used in the production, the name of the manufacturer of the material used in the production, the temperature of the heater 58 during the production, the generation of the produced three-dimensional shaped article, etc. The generation of the three-dimensional shaped article will be described later with reference to FIG. 13. When a recycled material is included in the material used in the production, the production information includes the weight ratio of the recycled material included in the material, the number of recycling times of the recycled material, the serial number of an already used three-dimensional shaped article used as a raw material of the recycled material, etc. The three-dimensional shaped article used as a raw material of the recycled material is sometimes referred to as "recycled three-dimensional shaped article".

The history data generation portion 650 generates history data representing identification information and production information using the identification data acquired through the identification data acquisition portion 620 and the production data acquired through the production data acquisition portion 640. The communication portion 660 transmits the generated history data to the server 700. The transmitted history data are managed by the server 700. The communication portion 660 can also acquire the history data managed by the server 700. In the history data that can be acquired by the communication portion 660, the history data of the three-dimensional shaped article produced in the past are also included.

FIG. 11 is an explanatory view showing one example of the history data managed by the server 700. In the history data for each serial number to be managed by the server 700, production information regarding the production date, the production site, the generation of the three-dimensional shaped article, the material used in the production, etc. is represented. When a recycled material is included in the material used in the production, the history data of the already used three-dimensional shaped article used as a raw material of the recycled material is associated. In FIG. 11, for example, in the history data regarding the three-dimensional shaped article with a serial number "ABC12345", the production date, the production site, the material used in the production, being a three-dimensional shaped article of the first generation, etc. are represented. The three-dimensional shaped article with a serial number "ABC12345" is a three-dimensional shaped article of the first generation, and therefore, a recycled material is not included in the material used in the production. Accordingly, the history data of an already used three-dimensional shaped article used as a raw material of a recycled material are not associated with the history data regarding the three-dimensional shaped article with a serial number "ABC12345".

In the history data regarding the three-dimensional shaped article with a serial number "ABC23456", the production date, the production site, the material used in the production, being a three-dimensional shaped article of the second generation, etc. are represented. The three-dimensional shaped article with a serial number "ABC23456" is a three-dimensional shaped article of the second generation, and therefore, a recycled material is included in the material used in the production. Accordingly, the history data of the three-dimensional shaped article with a serial number "ABC12345" and the history data of the three-dimensional shaped article with a serial number "ABC12346", each of which is an already used three-dimensional shaped article used as a raw material of the recycled material, are associated with the history data regarding the three-dimensional shaped article with a serial number "ABC23456". In this embodiment, under the history data of the three-dimensional shaped article with a serial number "ABC23456", the history data of the three-dimensional shaped article with a serial number "ABC12345" and the history data of the three-dimensional shaped article with a serial number "ABC12346" are represented by a tree structure.

In the history data regarding the three-dimensional shaped article with a serial number "ABC34567", the production date, the production site, the material used in the production, being a three-dimensional shaped article of the third generation, etc. are represented. The history data of the three-dimensional shaped article with a serial number "ABC23456" and the history data of a three-dimensional shaped article with a serial number "ABC23999, each of which was used as a raw material of the recycled material, are associated with the history data regarding the three-dimensional shaped article with a serial number "ABC34567". The three-dimensional shaped article with a serial number "ABC23456" used as a raw material of the recycled material is a three-dimensional shaped article of the second generation, and therefore, the history data of the three-dimensional shaped article with a serial number "ABC12345" and the history data of the three-dimensional shaped article with a serial number "ABC12346", each of which was used in the production thereof, are further associated with the history data thereof.

Figure 12:
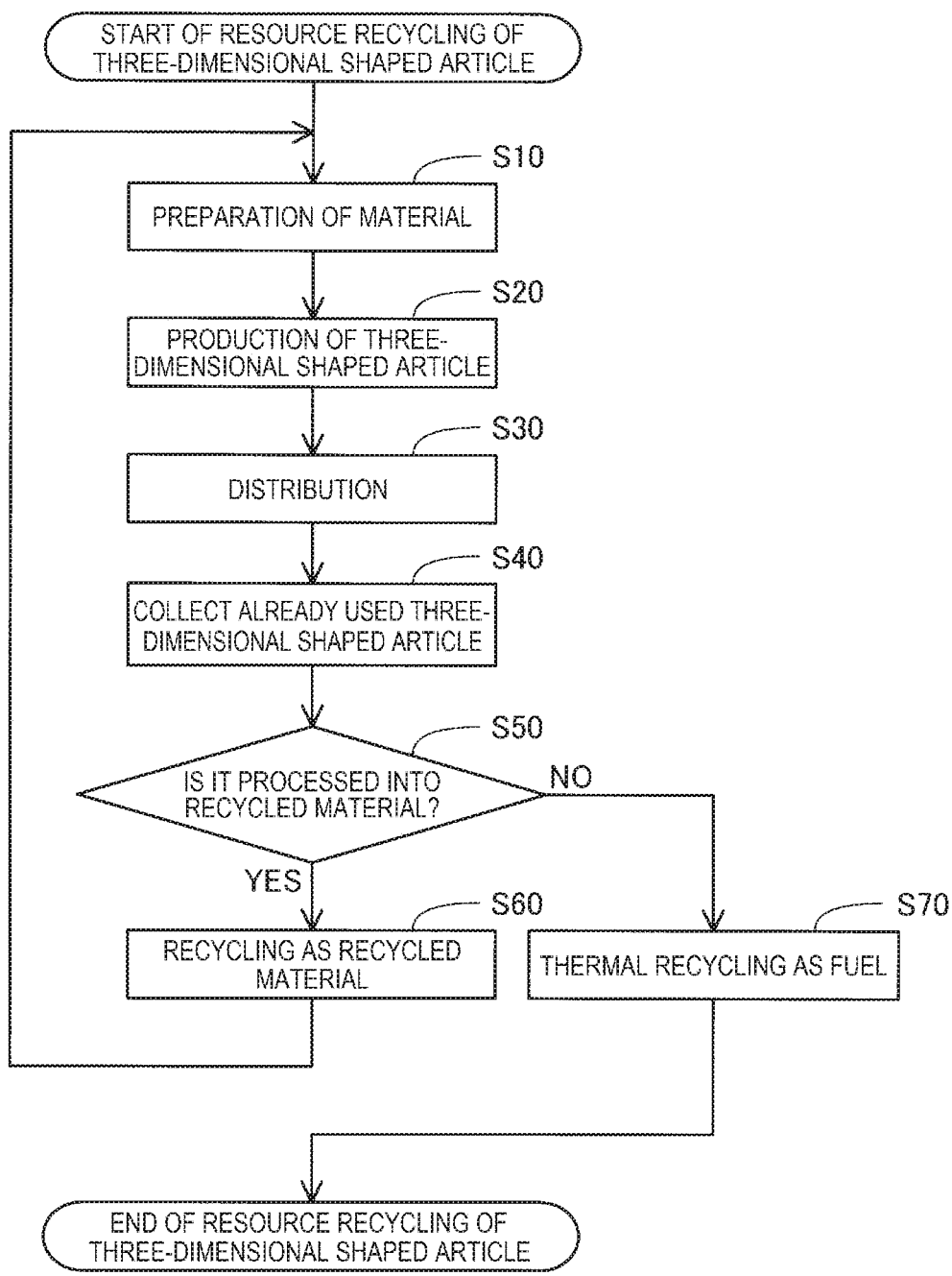
FIG. 12 is a flowchart showing one example of a step of recycling a three-dimensional shaped article as a resource.

FIG. 12 is a flowchart showing one example of a step of recycling a three-dimensional shaped article as a resource. This step is managed by a manufacturer of the three-dimensional shaped article or the like. First, in Step S10, by the manufacturer or the like, a material of the three-dimensional shaped article is prepared. In the prepared material, a recycled material may be included. Subsequently, in Step S20, a three-dimensional shaped article is produced by using the prepared material. In Step S30, the produced three-dimensional shaped article is shipped out, distributed in a market, and passed into the hands of a consumer or the like.

In Step S40, an already used three-dimensional shaped article discarded by a consumer or the like is collected by the manufacturer or the like. In Step S50, the manufacturer or the like determines whether the collected already used three-dimensional shaped article is processed into a recycled material. As the number of recycling times that is the number of times the three-dimensional shaped article was processed into a recycled material increases, the content of impurities in the recycled material increases. Therefore, for example, when the number of recycling times of the recycled material used in the production of the already used three-dimensional shaped article is less than a predetermined number of times, it is determined that the already used three-dimensional shaped article is processed into a recycled material.

When it is determined that the already used three-dimensional shaped article is processed into a recycled material in Step S50, in Step S60, the already used three-dimensional shaped article is processed into a recycled material through grinding, removal of foreign substances, etc. by the manufacturer or the like. Thereafter, going back to Step S10, the already used three-dimensional shaped article processed into the recycled material is recycled as a material of a new three-dimensional shaped article. The already used three-dimensional shaped article may be reused as a three-dimensional shaped article without being recycled as a recycled material. The recycling is sometimes referred to as "material recycling".

On the other hand, when it is not determined that the already used three-dimensional shaped article is processed into a recycled material in Step S50, the already used three-dimensional shaped article is thermally recycled as fuel in Step S70. That is, from the already used three-dimensional shaped article, thermal energy generated during incineration is recovered and used. By thermally recycling the already used three-dimensional shaped article, the step of recycling the three-dimensional shaped article as a resource is completed. When the already used three-dimensional shaped article cannot be thermally recycled, the already used three-dimensional shaped article may be disposed of by burying or the like.

Figure 13:
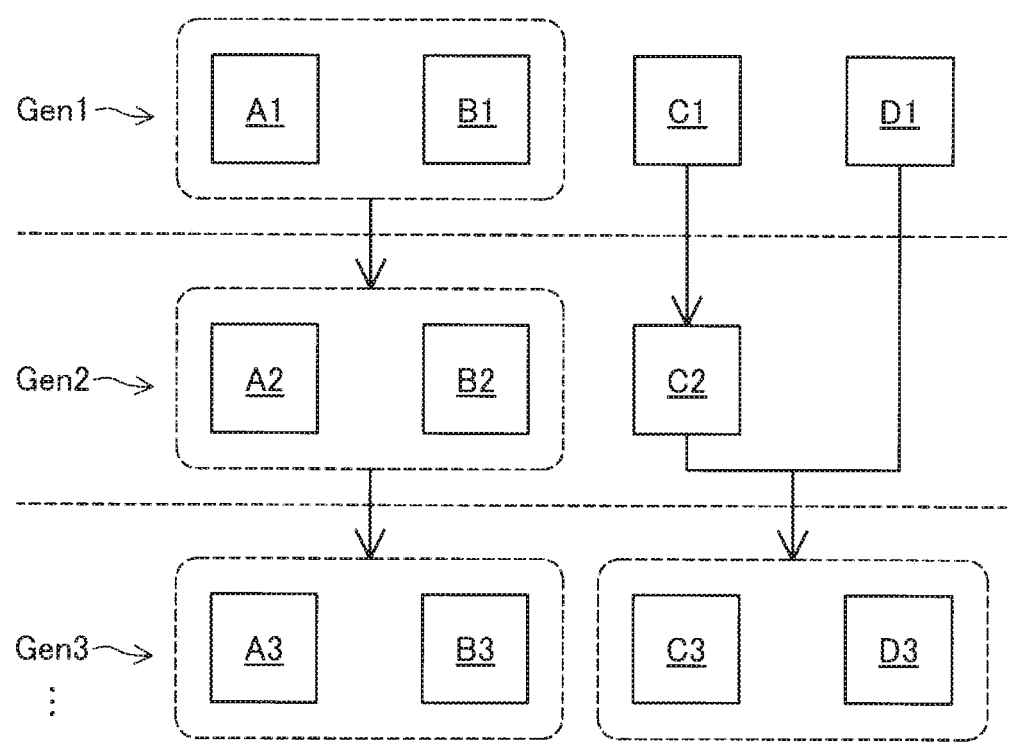
FIG. 13 is an explanatory view showing generation of the three-dimensional shaped article.

FIG. 13 is an explanatory view showing the generation of the three-dimensional shaped article. A three-dimensional shaped article produced using a new material is referred to as "three-dimensional shaped article of the first generation Gen1". A three-dimensional shaped article produced using a material including a recycled material using a three-dimensional shaped article of the first generation Gent as a raw material is referred to as "three-dimensional shaped article of the second generation Gen2". A three-dimensional shaped article produced using a material including a recycled material using a three-dimensional shaped article of the second generation Gen2 as a raw material is referred to as "three-dimensional shaped article of the third generation Gen3".

Product A1, Product B1, Product C1, and Product D1 are three-dimensional shaped articles produced using a new material. Therefore, Product A1, Product B1, Product C1, and Product D1 each correspond to a three-dimensional shaped article of the first generation Gen1.

Product A2 and Product B2 are three-dimensional shaped articles produced using a recycled material using Product A1 and Product B1, each of which is a three-dimensional shaped article of the first generation Gen1, as a raw material. Therefore, Product A2 and Product B2 each correspond to a three-dimensional shaped article of the second generation Gen2. Product C2 is a three-dimensional shaped article produced using a recycled material using Product C1 that is a three-dimensional shaped article of the first generation Gen1 as a raw material. Therefore, Product C2 corresponds to a three-dimensional shaped article of the second generation Gen2.

Product A3 and Product B3 are three-dimensional shaped articles produced using a recycled material using Product A2 and Product B2, each of which is a three-dimensional shaped article of the second generation Gen2, as a raw material. Therefore, Product A3 and Product B3 each correspond to a three-dimensional shaped article of the third generation Gen3. Product C3 and Product D3 are three-dimensional shaped articles produced using a recycled material using Product C2 that is a three-dimensional shaped article of the second generation Gen2 as a raw material and using a recycled material using Product D1 that is a three-dimensional shaped article of the first generation Gen1 as a raw material. Therefore, Product C3 and Product D3 each correspond to a three-dimensional shaped article of the third generation Gen3.

Figure 14:
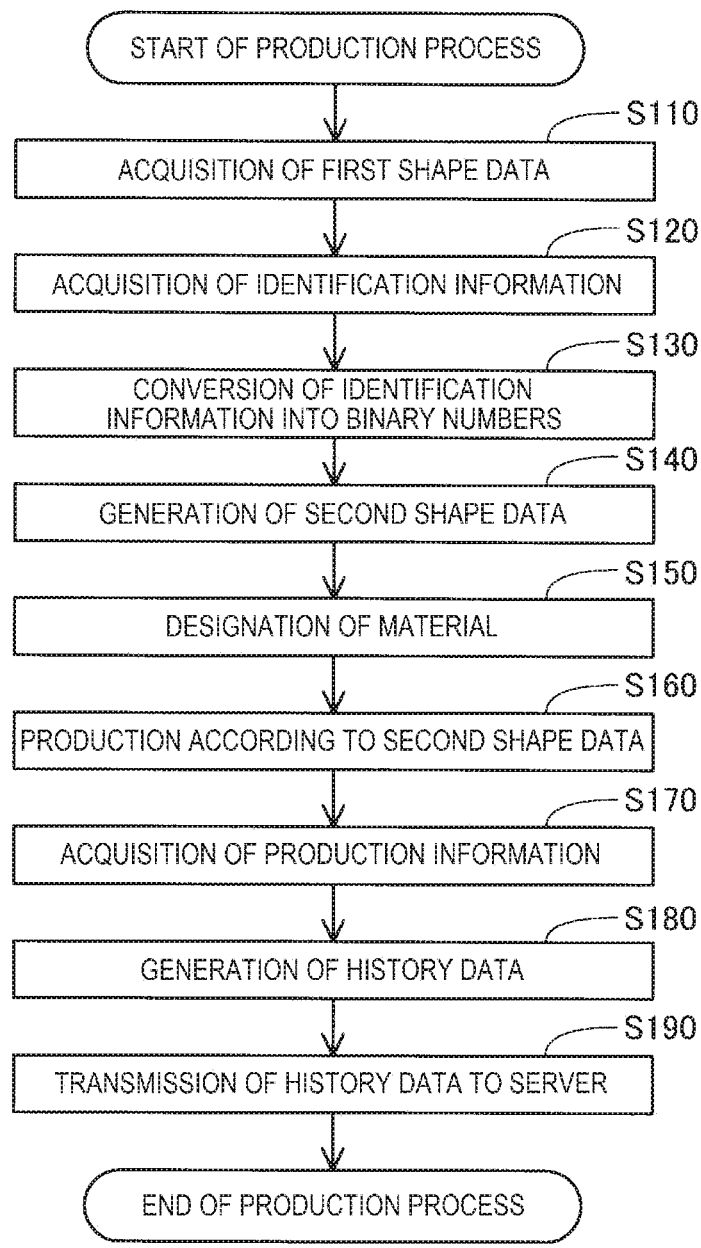
FIG. 14 is a flowchart showing contents of a production process in the first embodiment.

FIG. 14 is a flowchart showing contents of a production process for realizing the production of a three-dimensional shaped article OB in this embodiment. This process is executed when a predetermined start operation is performed by a user in the operation panel 115 provided in the three-dimensional shaping apparatus 100 or a computer coupled to the three-dimensional shaping apparatus 100.

First, in Step S110, the shape data acquisition portion 610 acquires first shape data for indicating the shape of the three-dimensional shaped article. In this embodiment, the shape data acquisition portion 610 acquires first shaping path data PD1 as the first shape data. The first shaping path data PD1 are, for example, data representing the moving path of the first nozzle 65 or the second nozzle 66 with respect to the shaping stage 300, the moving speed of the first nozzle 65 or the second nozzle 66 with respect to the shaping stage 300, or the ejection amount of the shaping material from the first nozzle 65 or the second nozzle 66. Data in STL format or AMF format for indicating the shape of the three-dimensional shaped article are converted into the first shaping path data PD1 by a slicer. The data in STL format or AMF format are generated using three-dimensional CAD software or three-dimensional CG software. The shape data acquisition portion 610 acquires the first shaping path data PD1 from a computer coupled to the three-dimensional shaping apparatus 100 or a recording medium such as a USB memory via an input/output interface. The acquired first shaping path data PD1 are transmitted to the shape data generation portion 630.

Subsequently, in Step S120, the identification data acquisition portion 620 acquires identification data representing identification information for identifying the three-dimensional shaped article OB to be produced. In this embodiment, the identification data acquisition portion 620 acquires identification data representing a serial number as the identification information. The serial number is, for example, expressed in hexadecimal numbers. The identification data acquisition portion 620 acquires one serial number from a plurality of serial numbers stored in advance in a memory of the data processing portion 600 as the serial number to be given to the three-dimensional shaped article OB to be produced. The identification data acquisition portion 620 may acquire a serial number designated by a used via the operation panel 115.

In Step S130, the identification data acquisition portion 620 converts the acquired serial number into a code expressed in binary numbers. The identification data acquisition portion 620 may convert the serial number into a code expressed in binary numbers according to a character code such as Unicode or ISO/IEC 10646.

Figure 15:
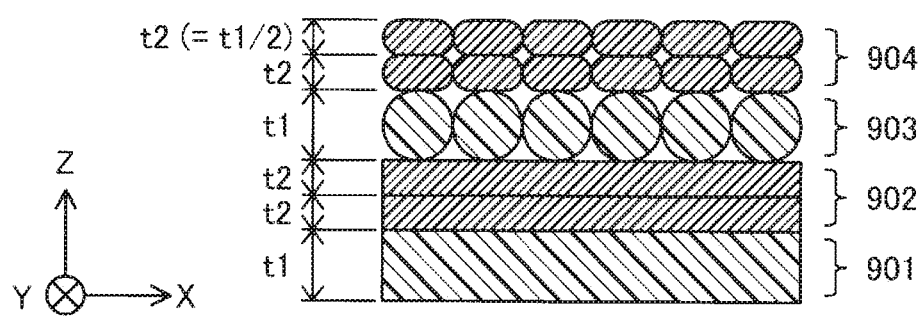
FIG. 15 is an explanatory view schematically showing types of layers having different characteristics.

FIG. 15 is an explanatory view schematically showing types of layers having different characteristics. With reference to FIGS. 14 and 15, in Step S140, the shape data generation portion 630 generates the second shape data for indicating the shape of the three-dimensional shaped article representing the serial number by an arrangement of layers having different characteristics using the first shaping path data PD1 and the identification data. In this embodiment, by stacking a first characteristic layer 901, a second characteristic layer 902, a third characteristic layer 903, and a fourth characteristic layer 904 having different characteristics, respectively, in a predetermined arrangement, the serial number is represented in the three-dimensional shaped article.

The first characteristic layer 901 has a characteristic that the thickness of the layer is a first thickness t1, and the extending direction of the shaping material in the layer is a first direction. The extending direction is a direction in which the shaping material disposed in the layer extends. The extending direction can also be said to be a direction along the moving path of the first nozzle 65 or the second nozzle 66. The second characteristic layer 902 has a form in which two layers having a second thickness t2 that is half the first thickness t1 are stacked, and also has a characteristic that the extending direction of the shaping material in the layer is the first direction. The third characteristic layer 903 has a characteristic that the thickness of the layer is the first thickness t1, and the extending direction of the shaping material in the layer is a second direction orthogonal to the first direction. The fourth characteristic layer 904 has a form in which two layers having the second thickness t2 are stacked, and also has a characteristic that the extending direction of the shaping material in the layer is the second direction. In this embodiment, the first thickness t1 is a thickness of a layer indicated by the first shaping path data PD1 output from the slicer. The first direction is a direction parallel to the X direction in FIG. 15, and the second direction is a direction parallel to the Y direction in FIG. 15. Note that the thickness of each layer indicated by the first shaping path data PD1 output from the slicer is a uniform thickness.

In this embodiment, "0" is represented by the first characteristic layer 901, "1" is represented by the second characteristic layer 902, the start point of the code indicating the serial number is represented by the third characteristic layer 903, and the end point of the code indicating the serial number is represented by the fourth characteristic layer 904. By stacking the first characteristic layer 901 and the second characteristic layer 902 in a predetermined arrangement according to the code indicating the serial number between the third characteristic layer 903 and the fourth characteristic layer 904, the code indicating the serial number can be represented in a readable manner. Note that FIG. 15 is a schematic view for explaining the characteristics of the respective characteristic layers 901 to 904, and the arrangement of the respective characteristic layers 901 to 904 shown in FIG. 15 is different from the arrangement of the respective characteristic layers 901 to 904 in this embodiment. The arrangement of the respective characteristic layers 901 to 904 in this embodiment will be described later with reference to FIG. 18.

Figure 16:
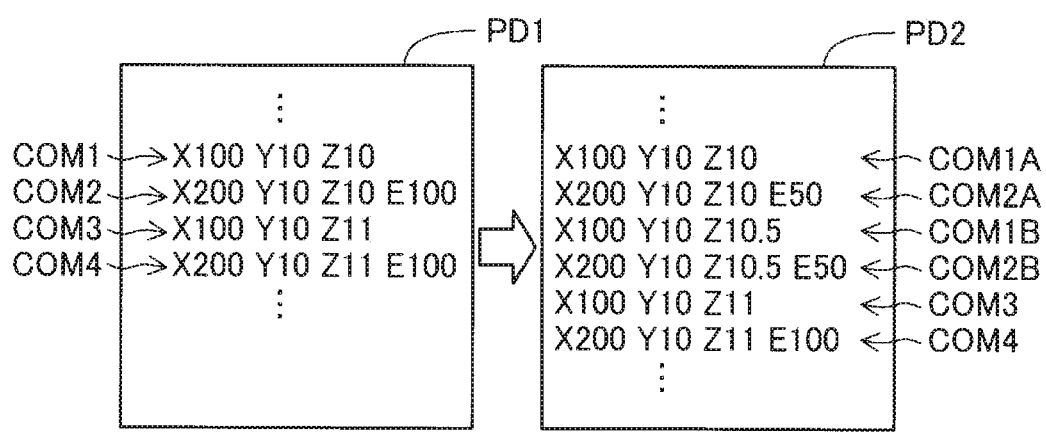
FIG. 16 is an explanatory view showing one example of first shape data and second shape data.

FIG. 16 is an explanatory view showing one example of the first shape data and the second shape data. The shape data generation portion 630 generates the second shaping path data PD2 by changing the moving path of the first nozzle 65 or the second nozzle 66 with respect to the shaping stage 300, or the ejection amount of the shaping material from the first nozzle 65 or the second nozzle 66 represented by the first shaping path data PD1.

In the first shaping path data PD1, a command COM1 to move the first nozzle 65 or the second nozzle 66 to a coordinate (X, Y, Z)=(100, 10, 10) is set. This coordinate represents a relative position of the first nozzle 65 or the second nozzle 66 with respect to the shaping stage 300. A command COM2 to move the first nozzle 65 or the second nozzle 66 from the coordinate (X, Y, Z)=(100, 10, 10) to a coordinate (X, Y, Z)=(200, 10, 10) and also to eject the shaping material in an amount of 100 units from the first nozzle 65 or the second nozzle 66 while the first nozzle 65 or the second nozzle 66 is moving in this interval is set. A command COM3 to move the first nozzle 65 or the second nozzle 66 to a coordinate (X, Y, Z)=(100, 10, 11) is set. A command COM4 to move the first nozzle 65 or the second nozzle 66 from the coordinate (X, Y, Z)=(100, 10, 11) to a coordinate (X, Y, Z)=(200, 10, 11) and also to eject the shaping material in an amount of 100 units from the first nozzle 65 or the second nozzle 66 while the first nozzle 65 or the second nozzle 66 is moving in this interval is set.

In the second shaping path data PD2, in order to form the second characteristic layer 902, the command COM1 to the command COM2 in the first shaping path data PD1 are changed to a command COM1A to a command COM2B. In the second shaping path data PD2, the command COM1A to move the first nozzle 65 or the second nozzle 66 to a coordinate (X, Y, Z)=(100, 10, 10) is set. A command COM2A to move the first nozzle 65 or the second nozzle 66 from the coordinate (X, Y, Z)=(100, 10, 10) to a coordinate (X, Y, Z)=(200, 10, 10) and also to eject the shaping material in an amount of 50 units from the first nozzle 65 or the second nozzle 66 while the first nozzle 65 or the second nozzle 66 is moving in this interval is set. A command COM1B to move the first nozzle 65 or the second nozzle 66 to a coordinate (X, Y, Z)=(100, 10, 10.5) is set. The command COM2B to move the first nozzle 65 or the second nozzle 66 from the coordinate (X, Y, Z)=(100, 10, 10.5) to a coordinate (X, Y, Z)=(200, 10, 10.5) and also to eject the shaping material in an amount of 50 units from the first nozzle 65 or the second nozzle 66 while the first nozzle 65 or the second nozzle 66 is moving in this interval is set. The first characteristic layer 901 can be formed by the command COM3 and the command COM4 set in the first shaping path data PD1, and therefore, in the second shaping path data PD2, the same commands as the command COM3 and the command COM4 set in the first shaping path data PD1 are set. With respect to a command unrelated to the formation of the respective characteristic layers 901 to 904 among the commands set in the first shaping path data PD1, the same command as that set in the first shaping path data PD1 is set in the second shaping path data PD2.

With reference to FIG. 14, in Step S150, a material to be used in the production of the three-dimensional shaped article OB is designated. When a recycled material is included in the material to be used in the production of the three-dimensional shaped article OB, the identification information of the already used three-dimensional shaped article used as a raw material of the recycled material is designated together with the type of the material. In this embodiment, a barcode or a two-dimensional code indicating the type of the material is provided in a package of the material, and by reading the barcode or the two-dimensional code by the reading portion 140, the type of the material is designated. In the package of the material including the recycled material, the barcode or the two-dimensional code indicating information regarding the identification information of the already used three-dimensional shaped article used as a raw material of the recycled material together with the type of the material is provided, and by reading the barcode or the two-dimensional code by the reading portion 140, the identification information of the already used three-dimensional shaped article used as a raw material of the recycled material is designated together with the type of the material. The material to be used in the production of the three-dimensional shaped article OB or the identification information of the already used three-dimensional shaped article used as a raw material of the recycled material may be designated by operating the operation panel 115 by a user. In addition, when the material is designated, for example, the temperature of the heater 58 or the like may be designated.

Figure 17:
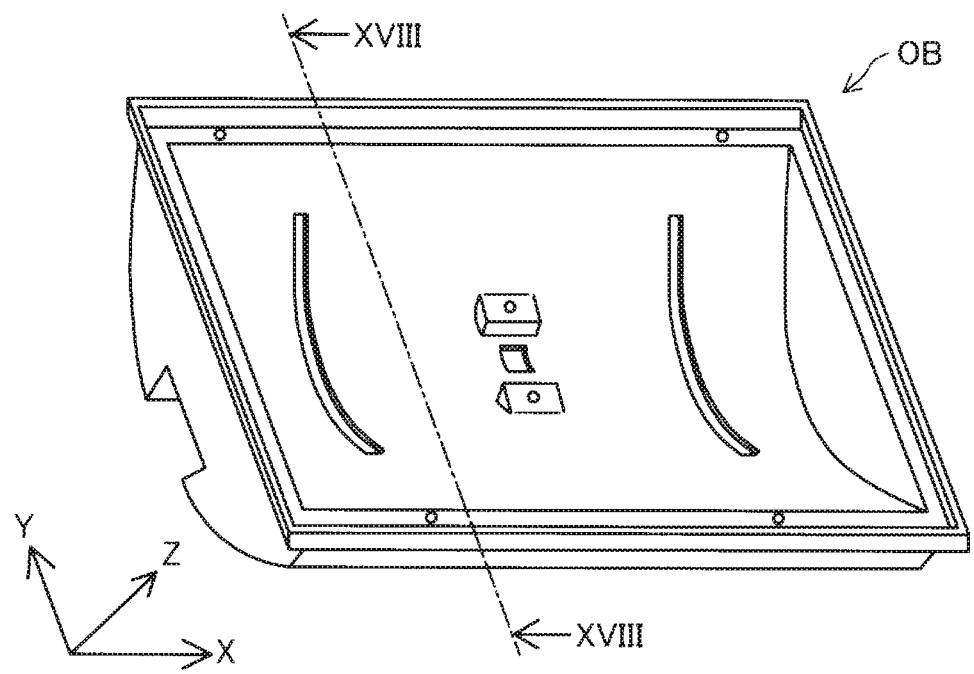
FIG. 17 is an explanatory view showing a three-dimensional shaped article produced according to the second shape data.
Figure 18:
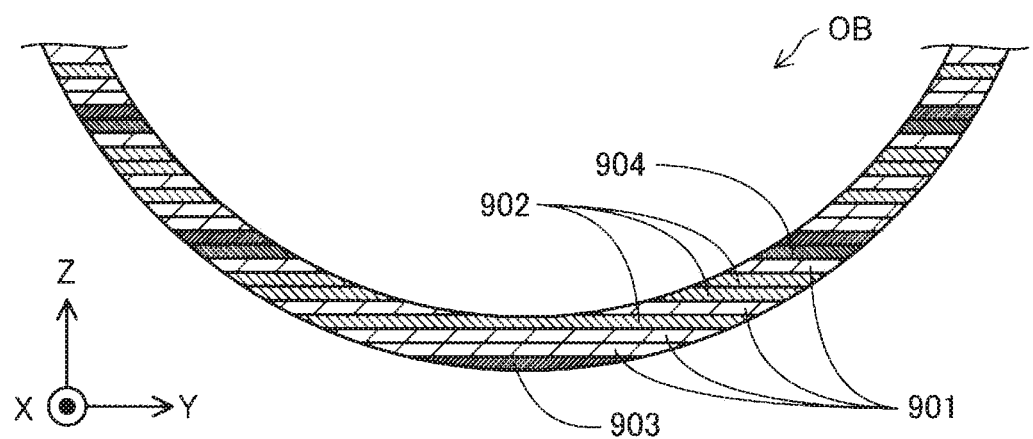
FIG. 18 is a cross-sectional view taken along the line XVIII-XVIII of the three-dimensional shaped article.

FIG. 17 is an explanatory view showing the three-dimensional shaped article OB produced according to the second shape data. FIG. 18 is a cross-sectional view taken along the line XVIII-XVIII of the three-dimensional shaped article OB in FIG. 17. With reference to FIGS. 14, 17, and 18, in Step S160, the controller 500 controls the ejection unit 200 and the moving mechanism 400 according to the second shaping path data PD2, thereby producing the three-dimensional shaped article OB. In this embodiment, the controller 500 ejects the shaping material from the first nozzle 65 having a small diameter according to the second shaping path data PD2 so as to form the second characteristic layer 902 and the fourth characteristic layer 904. The shaping material is ejected from the second nozzle 66 having a large diameter so as to form the first characteristic layer 901 and the third characteristic layer 903. In the produced three-dimensional shaped article OB, between the third characteristic layer 903 and the fourth characteristic layer 904, the first characteristic layer 901 and the second characteristic layer 902 are stacked in a predetermined arrangement according to the code indicating the serial number. Therefore, the arrangement of the respective characteristic layers 901 to 904 is acquired from the cross section of the three-dimensional shaped article OB, and the serial number of the three-dimensional shaped article OB can be acquired from the arrangement of the respective characteristic layers 901 to 904.

With reference to FIG. 14, in Step S170, the production data acquisition portion 640 acquires the production information of the three-dimensional shaped article OB produced in Step S160. When the three-dimensional shaped article OB is produced using a material including a recycled material, the production information acquired by the production data acquisition portion 640 includes the serial number of the three-dimensional shaped article used as a raw material of the recycled material. In Step S180, the history data generation portion 650 generates history data using the serial number and the production information of the three-dimensional shaped article OB. In Step S190, the history data generation portion 650 transmits the generated history data to the server 700 via the communication portion 660. The transmitted history data are managed by the server 700.

According to the three-dimensional shaping system 10 of this embodiment described above, the controller 500 produces the three-dimensional shaped article OB in which the respective characteristic layers 901 to 904 are stacked in a predetermined arrangement according to the serial number, and the data processing portion 600 transmits the serial number of the three-dimensional shaped article OB and the history data representing various types of production information regarding the three-dimensional shaped article OB to the server 700. Therefore, by using a produced three-dimensional shaped article OB, the serial number of the three-dimensional shaped article OB can be acquired, and by using the acquired serial number, the history data regarding the three-dimensional shaped article OB to be managed by the server 700 can be acquired. Accordingly, by using the three-dimensional shaped article OB, various types of production information regarding the three-dimensional shaped article OB can be identified.

Further, in this embodiment, by separately using the first nozzle 65 and the second nozzle 66 depending on the characteristic, the characteristics of the layers of the three-dimensional shaped article OB can be easily made different. In particular, in this embodiment, the second characteristic layer 902 and the fourth characteristic layer 904, each of which is thin, are formed by ejecting the shaping material from the first nozzle 65 having a small diameter, and the first characteristic layer 901 and the third characteristic layer 903, each of which is thick, are formed by ejecting the shaping material from the second nozzle 66 having a large diameter, and therefore, the characteristics of the respective characteristic layers 901 to 904 can be more accurately represented.

Further, in this embodiment, the characteristics of the layers can be made different by the extending direction of the shaping material for forming the layers of the three-dimensional shaped article OB. Therefore, even if the thicknesses of the layers of the shaping material or the wire diameters of the shaping material are not made different, at least two types of characteristics of the layers can be represented.

In this embodiment, an ABS resin material in a pellet form is used, however, as the material used in the ejection unit 200, for example, a material for producing a three-dimensional shaped article using a material having thermoplasticity as a main material can also be adopted. Here, the "main material" refers to a material mainly used for forming the shape of the three-dimensional shaped article and means a material whose content is 50 wt % or more in the three-dimensional shaped article. In the above-mentioned shaping material, a material obtained by melting such a main material singly, or a material formed into a paste by melting a part of the components contained together with the main material is included.

When a material having thermoplasticity is used as the main material, the shaping material is formed by plasticization of the material in the melting portion 30. The "plasticization" refers to melting by applying heat to the material having thermoplasticity.

As the material having thermoplasticity, for example, any one or a combination of two or more of the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone (PEEK)

In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and converted into a molten state by the rotation of the flat screw 40 and heating by the heater 58 in the melting portion 30. The shaping material formed in this manner is ejected from the first nozzle hole 67 or the second nozzle hole 68, and thereafter cured by decreasing the temperature.

The material having thermoplasticity is desirably injected from the first nozzle hole 67 or the second nozzle hole 68 in a completely molten state by being heated to a temperature equal to or higher than the glass transition point thereof. For example, an ABS resin has a glass transition point of about 120° C. and the temperature thereof when it is injected from the first nozzle hole 67 or the second nozzle hole 68 is desirably about 200° C. In order to inject the shaping material in a high temperature state in this manner, the temperature of the first nozzle heater 91 and the second nozzle heater 92 is desirably controlled.

B. Second Embodiment

Figure 19:
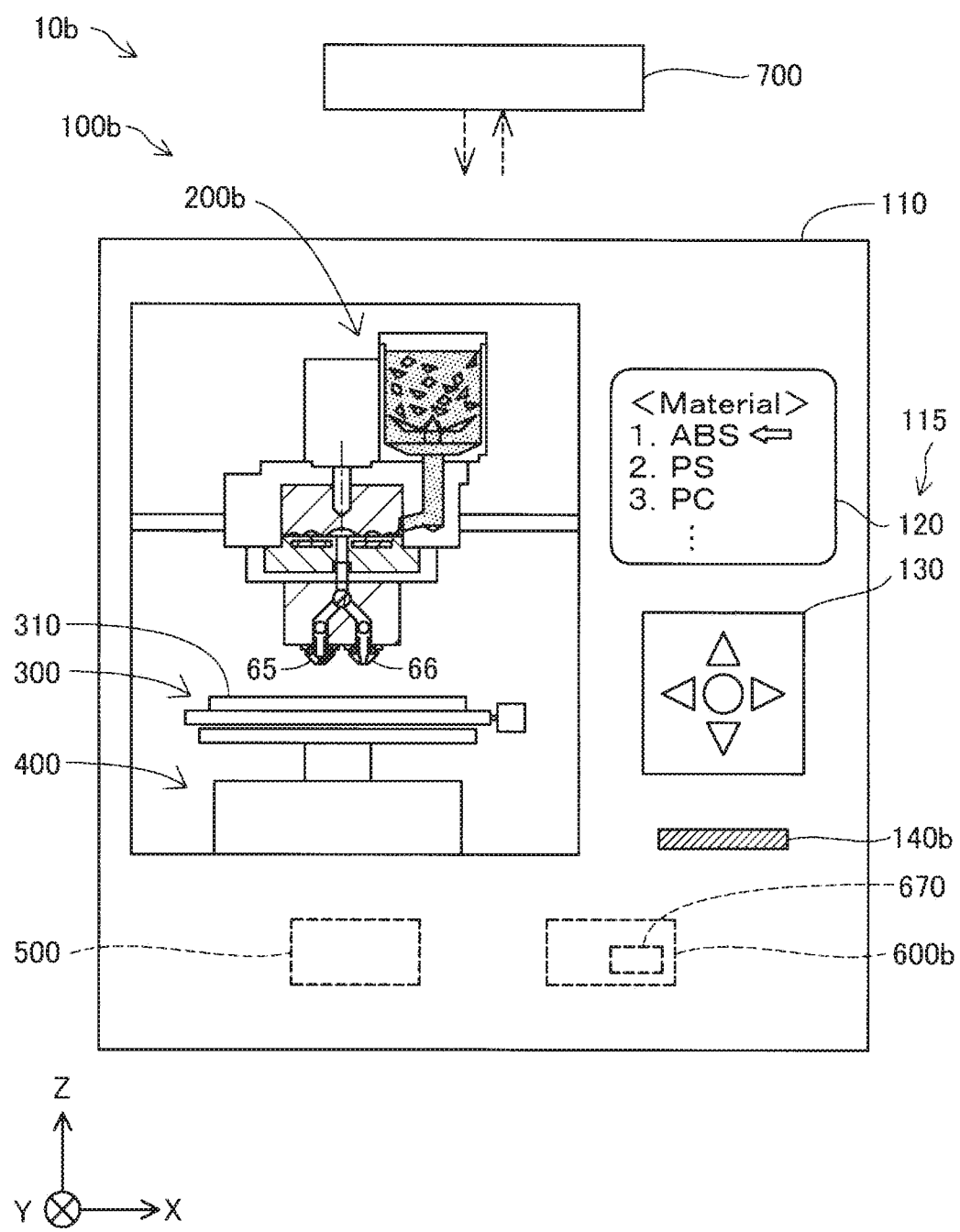
FIG. 19 is an explanatory view showing a schematic configuration of a three-dimensional shaping system in a second embodiment.
Figure 20:
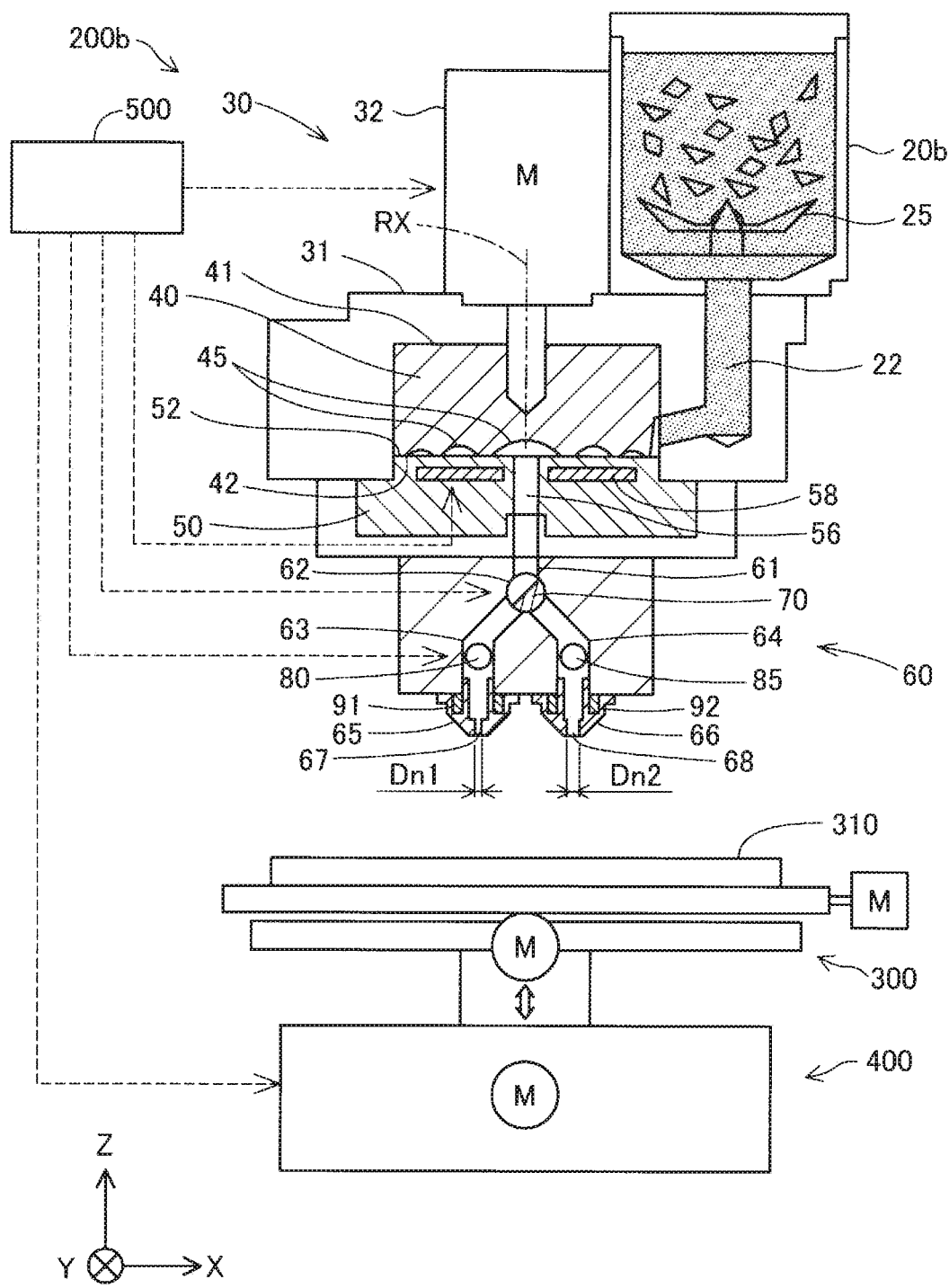
FIG. 20 is an explanatory view showing a schematic configuration of an ejection unit in the second embodiment.

FIG. 19 is an explanatory view showing a schematic configuration of a three-dimensional shaping system 10b in a second embodiment. FIG. 20 is an explanatory view showing a schematic configuration of an ejection unit 200b in the second embodiment. The three-dimensional shaping system 10b of the second embodiment is different from that of the first embodiment in that a determination portion 670 determining whether an already used three-dimensional shaped article is used as a recycled material, and a grinding portion 25 grinding the already used three-dimensional shaped article to form a recycled material are provided in a three-dimensional shaping apparatus 100b. Further, the contents of a production process for producing a three-dimensional shaped article OB are different from those of the first embodiment. The other configuration is the same as that of the first embodiment shown in FIG. 1 unless otherwise described.

In this embodiment, the determination portion 670 is provided in a data processing portion 600b. The determination portion 670 determines whether an already used three-dimensional shaped article is processed into a recycled material by grinding in the grinding portion 25. The determination portion 670 is configured to be able to acquire identification information of the already used three-dimensional shaped article acquired by a reading portion 140b.

The determination portion 670 is configured to be able to communicate with a server 700 via a communication portion 660.

In this embodiment, the grinding portion 25 is configured as a blade including a plurality of hard and sharp edges provided in a material supply portion 20b. This blade rotates in the material supply portion 20b by a motor driven under the control of a controller 500. For example, when an already used three-dimensional shaped article is fed to the material supply portion 20b, the already used three-dimensional shaped article is ground by the rotating blade. The ground already used three-dimensional shaped article is supplied to a melting portion 30 as a recycled material.

In this embodiment, the reading portion 140b is configured to be able to read the identification information of the already used three-dimensional shaped article by capturing an image of a cross section representing the identification information in the already used three-dimensional shaped article with a camera and analyzing the captured image.

Figure 21:
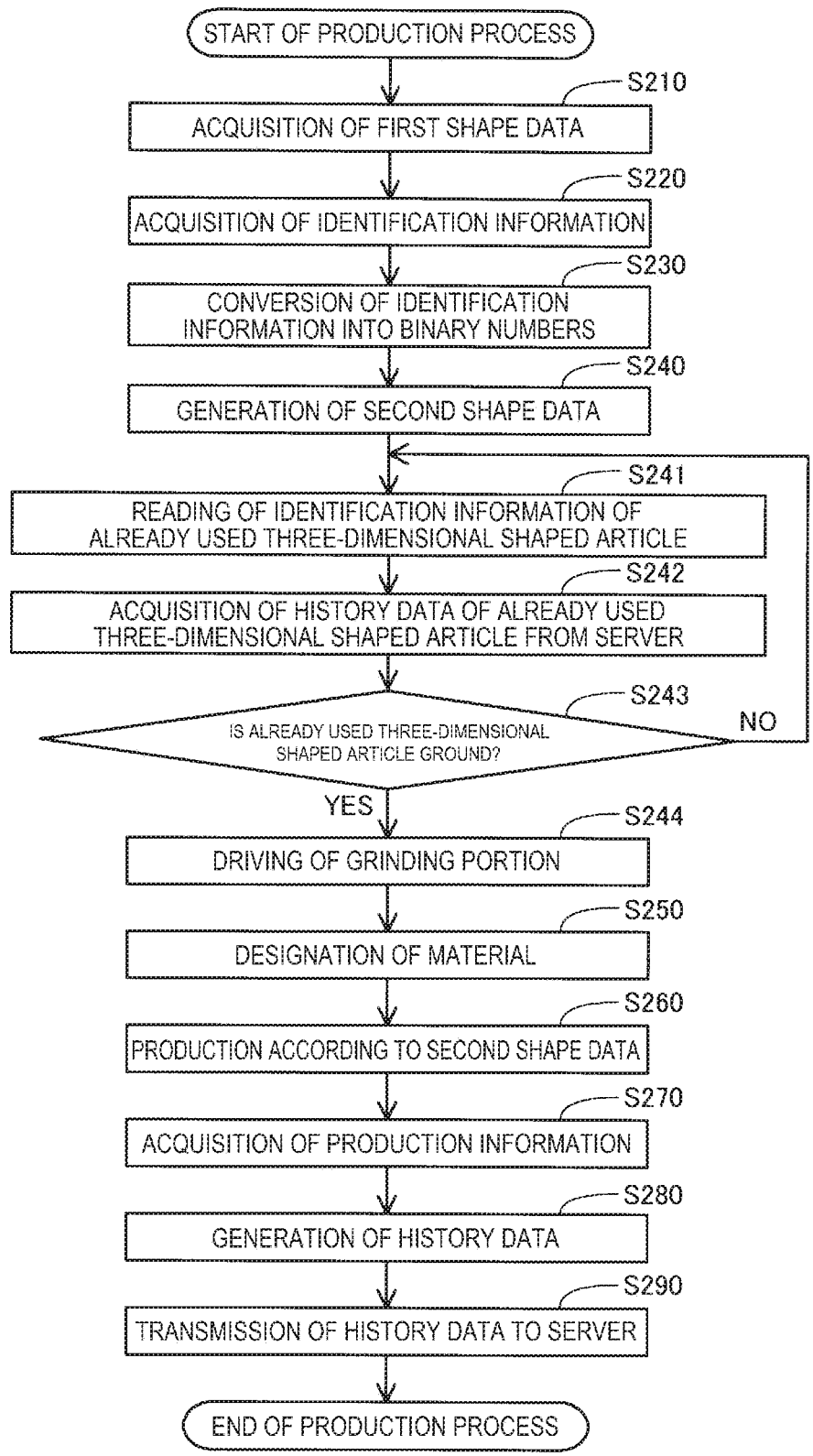
FIG. 21 is a flowchart showing contents of a production process in the second embodiment.

FIG. 21 is a flowchart showing contents of a production process for realizing the production of the three-dimensional shaped article OB in this embodiment. This process is executed when a predetermined start operation is performed by a user in an operation panel 115 provided in the three-dimensional shaping apparatus 100b or a computer coupled to the three-dimensional shaping apparatus 100b. In this embodiment, this process is executed when a mode in which an already used three-dimensional shaped article is ground and used as a recycled material is selected by operating the operation manel 115 by a user. When a mode in which a new material in a pellet form or a recycled material in a pellet form is used is selected by operating the operation manel 115 by a user, the same production process as the production process of the first embodiment described with reference to FIG. 14 is executed.

The contents of the process from Step S210 to Step S240 are the same as the contents of the process from Step S110 to Step S140 in the first embodiment described with reference to FIG. 14, and therefore, a description thereof will be omitted.

In Step S241, the cross section representing the identification information in the already used three-dimensional shaped article is read by the reading portion 140b. In this embodiment, a user holds the already used three-dimensional shaped article up over the reading portion 140b so as to make the reading portion 140b read the cross section representing the identification information.

In Step S242, the determination portion 670 acquires history data representing the identification information and the production information of the already used three-dimensional shaped article from the server 700 via the communication portion 660 using the identification information acquired by the reading portion 140b.

In Step S243, the determination portion 670 determines whether the already used three-dimensional shaped article is processed into a recycled material by grinding in the grinding portion 25 using the acquired history data. The determination portion 670 determines whether the already used three-dimensional shaped article is processed into a recycled material by grinding based on the deterioration state of the already used three-dimensional shaped article. The determination portion 670 determines that the already used three-dimensional shaped article is processed into a recycled material by grinding in the grinding portion 25, for example, when the already used three-dimensional shaped article is younger than the third generation.

When it is not determined that the already used three-dimensional shaped article is processed into a recycled material by grinding in Step S243, the process is returned to Step S241. In such a case, the user prepares another already used three-dimensional shaped article and makes the reading portion 140b read the shape indicating the identification information. If the user cannot prepare another already used three-dimensional shaped article, the user can also forcibly terminate the production process by operating the operation panel 115. In such a case, a new three-dimensional shaped article OB can be produced by selecting a mode in which a new material in a pellet form or a recycled material in a pellet form is used is selected by operating the operation panel 115 by the user.

On the other hand, when it is determined that the already used three-dimensional shaped article is processed into a recycled material by grinding in Step S243, driving of the grinding portion 25 is started in Step S244. By feeding the already used three-dimensional shaped article in which the shape indicating the identification information was read by the reading portion 140b to the material supply portion 20b by the user, the already used three-dimensional shaped article is ground by the grinding portion 25 and is used in the production of a new three-dimensional shaped article OB as a recycled material.

In Step S250, the material of the three-dimensional shaped article OB to be newly produced is designated using the history data of the already used three-dimensional shaped article acquired in Step S242. For example, when the already used three-dimensional shaped article is made of an ABS resin, as the material of the three-dimensional shaped article OB to be newly produced, a recycled material of an ABS resin is designated.

In Step S260, the controller 500 controls the ejection unit 200 and the moving mechanism 400 according to the second shaping path data PD2, thereby producing the three-dimensional shaped article OB representing a serial number by the arrangement of the layers having different characteristics.

In Step S270, the production data acquisition portion 640 acquires the production information of the three-dimensional shaped article OB produced in Step S260. In the production information, the identification information of the already used three-dimensional shaped article used as a raw material of the recycled material is included.

In Step S280, the history data generation portion 650 generates history data of the newly produced three-dimensional shaped article OB using the identification information of the newly produced three-dimensional shaped article OB and the production information of the newly produced three-dimensional shaped article OB. In Step S290, the history data generation portion 650 transmits the generated history data to the server 700 via the communication portion 660. The transmitted history data are managed by the server 700.

According to the three-dimensional shaping system 10b of this embodiment described above, it is possible to determine whether an already used three-dimensional shaped article is processed into a recycled material using the history data of the already used three-dimensional shaped article managed by the server 700. That is, it is possible to determine whether an already used three-dimensional shaped article is processed into a recycled material in consideration of the deterioration state or the like of the already used three-dimensional shaped article. Therefore, formation of a recycled material of low quality can be suppressed.

In particular, in this embodiment, the grinding portion 25 is provided in the material supply portion 20b, and therefore, even if the already used three-dimensional shaped article is not processed into a pellet form or the like, by grinding the already used three-dimensional shaped article by the grinding portion 25, the resulting material can be used as a recycled material.

Figure 22:
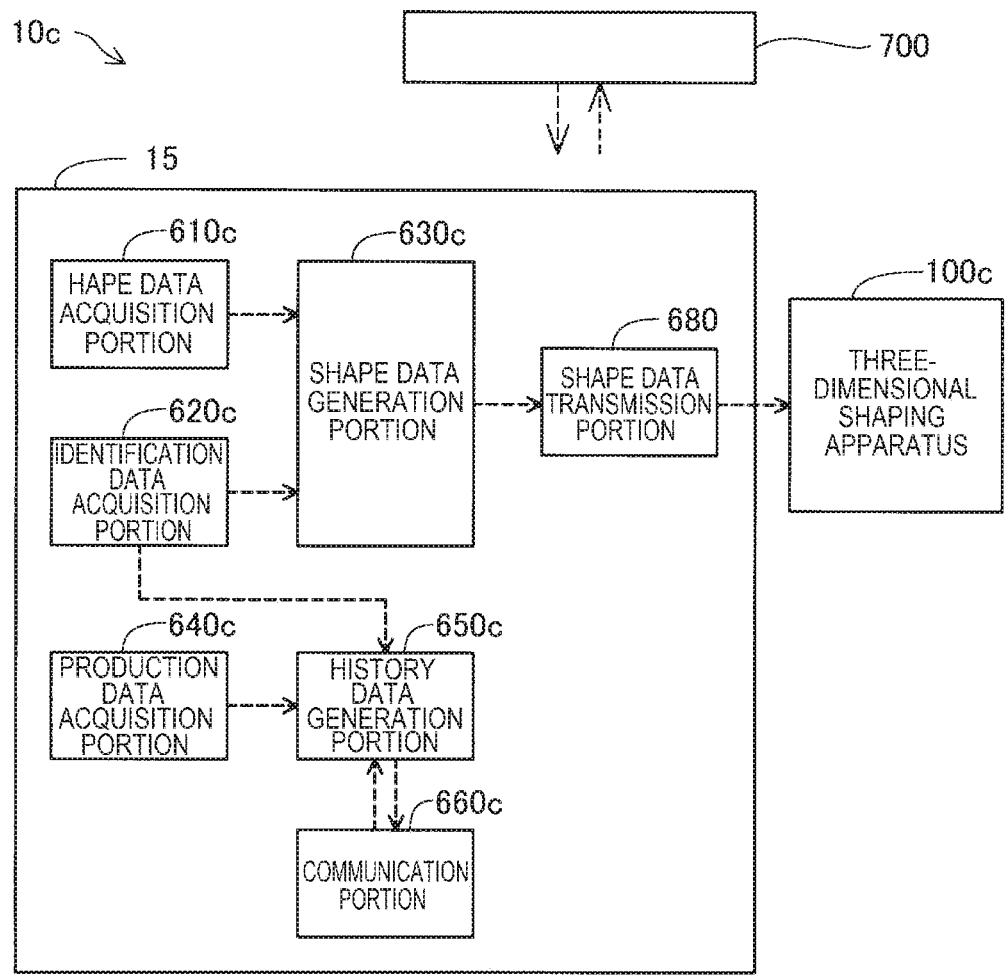
FIG. 22 is an explanatory view showing a schematic configuration of a three-dimensional shaping system as another embodiment.

C. Other Embodiments (C1) FIG. 22 is an explanatory view showing a schematic configuration of a three-dimensional shaping system 10c as another embodiment. The three-dimensional shaping system 10c includes a three-dimensional shaping apparatus 100c, a data processing apparatus 15, and a server 700. The configuration of the three-dimensional shaping apparatus 100c in the three-dimensional shaping system 10c is the same as the configuration in which the data processing portion 600 is excluded from the three-dimensional shaping apparatus 100 of the first embodiment. The data processing apparatus 15 is provided outside the three-dimensional shaping apparatus 100c. The data processing apparatus 15 includes a shape data acquisition portion 610c, an identification data acquisition portion 620c, a shape data generation portion 630c, a production data acquisition portion 640c, a history data generation portion 650c, a communication portion 660c, and a shape data transmission portion 680. The shape data acquisition portion 610c, the identification data acquisition portion 620c, the shape data generation portion 630c, the production data acquisition portion 640c, the history data generation portion 650c, and the communication portion 660c have the same functions as the shape data acquisition portion 610, the identification data acquisition portion 620, the shape data generation portion 630, the production data acquisition portion 640, the history data generation portion 650, and the communication portion 660 in the data processing portion 600 of the first embodiment. The shape data transmission portion 680 is configured to be able to communicate with the three-dimensional shaping apparatus 100c by wire or wirelessly, and transmits the second shape data generated by the shape data generation portion 630c to the three-dimensional shaping apparatus 100c. In this embodiment, the data processing apparatus 15 is constituted by a computer including one or more processors, a main storage device, and an input/output interface for performing signal input/output to/from the outside. The data processing apparatus 15 exhibits various functions by execution of a program or a command read on the main storage device by the processor. Further, the three-dimensional shaping apparatus 100c may have a configuration in which the data processing portion 600b is excluded from the three-dimensional shaping apparatus 100b of the second embodiment, and the data processing apparatus 15 may have the same function as the data processing portion 600b of the second embodiment, and also may be configured to include the above-mentioned shape data transmission portion 680.

Figure 23:
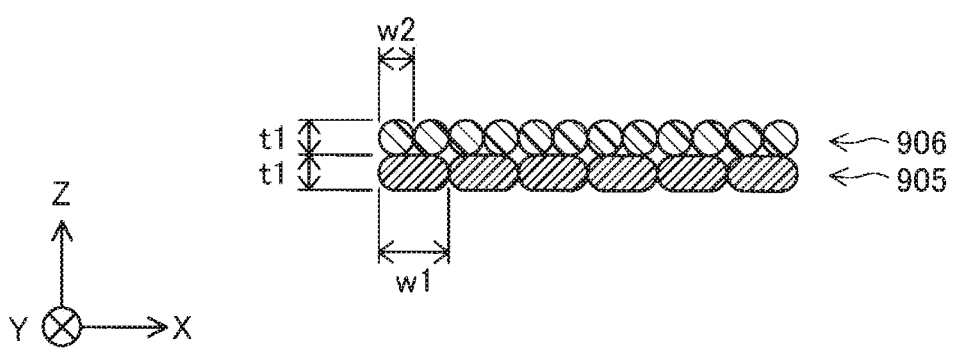
FIG. 23 is an explanatory view schematically showing types of layers having different characteristics as another embodiment.

(C2) FIG. 23 is an explanatory view schematically showing types of layers having different characteristics as another embodiment. In the above-mentioned respective embodiments, as the characteristics of the layers for indicating the identification information of the three-dimensional shaped article OB, the thickness of the shaping material for forming the layer and the extending direction of the shaping material in the layer are used. On the other hand, as the characteristics of the layers for indicating the identification information of the three-dimensional shaped article OB, various characteristics such as the line width of the shaping material for forming the layer, the type of the shaping material for forming the layer, and the color of the shaping material for forming the layer may be used. In FIG. 23, as one example, a fifth characteristic layer 905 and a sixth characteristic layer 906, in which the line widths of the shaping material for forming the layers are different from each other are shown. The line width w2 of the sixth characteristic layer 906 can be set to, for example, half the line width w1 of the fifth characteristic layer 905.

(C3) In the above-mentioned respective embodiments, in the three-dimensional shaped article OB to be produced, "0" is represented by the first characteristic layer 901, "1" is represented by the second characteristic layer 902, the start point of a code indicating a serial number is represented by the third characteristic layer 903, and the end point of the code indicating the serial number is represented by the fourth characteristic layer 904. On the other hand, in the three-dimensional shaped article OB to be produced, the fourth characteristic layer 904 need not be provided. In such a case, by previously determining the number of digits of the code indicating the serial number, the identification information can be represented in a readable manner by the arrangement of three types of layers having different characteristics, respectively. Further, in the three-dimensional shaped article OB to be produced, the third characteristic layer 903 and the fourth characteristic layer 904 need not be provided. In such a case, for example, by previously determining that a case where the layer representing "0" continues a predetermined number of times represents the start point of the code, the identification information can be represented in a readable manner by the arrangement of two types of layers having different characteristics, respectively.

(C4) In the three-dimensional shaping system 10 or 10b of the above-mentioned respective embodiments, the first shaping path data PD1 is used as the first shape data. On the other hand, as the first shape data, three-dimensional CAD data may be used. In such a case, for example, a function as a slicer is incorporated in the shape data generation portion 630, and the shape data generation portion 630 generates the second shaping path data PD2 using the supplied three-dimensional CAD data and the identification data.

(C5) In the three-dimensional shaping system 10 of the above-mentioned first embodiment, the material supply portion 20 of the three-dimensional shaping apparatus 100 may be constituted by a cartridge housing a recycled material. The system may be configured such that the cartridge has a built-in chip in which the identification information of an already used three-dimensional shaped article used as a raw material of the recycled material housed in the cartridge is stored, and by electrically coupling a connector of the cartridge and a connector provided in the three-dimensional shaping apparatus 100, the identification information stored in the chip is acquired as a part of the production information of the newly produced three-dimensional shaped article OB.

(C6) In the three-dimensional shaping system 10b of the above-mentioned second embodiment, the reading portion 140b, the determination portion 670, and the grinding portion 25 are not provided in the three-dimensional shaping apparatus 100b, and the reading portion 140b, the determination portion 670, and the grinding portion 25 may be configured as a separate unit. For example, a unit in which a belt conveyor, the reading portion 140b, the determination portion 670, and the grinding portion 25 are combined can be formed. In this unit, the reading portion 140b is provided above the belt conveyor. The grinding portion 25 is provided downstream of the reading portion 140b in the belt conveyor. The grinding portion 25 is constituted by a crusher crushing an already used three-dimensional shaped article. With respect to the already used three-dimensional shaped article conveyed by the belt conveyor, the identification information is scanned by the reading portion 140*b*, and it is determined whether the already used three-dimensional shaped article is processed into a recycled material by grinding in the grinding portion 25 by the determination portion 670. When it is determined that the already used three-dimensional shaped article is processed into a recycled material by grinding in the grinding portion 25, the already used three-dimensional shaped article is conveyed to the grinding portion 25 and ground by the grinding portion 25. The ground already used three-dimensional shaped article may be automatically supplied to the material supply portion 20*b* of the three-dimensional shaping apparatus 100*b* by the belt conveyor. When it is not determined that the already used three-dimensional shaped article is processed into a recycled material by grinding in the grinding portion 25, it may be conveyed to a disposal box without being conveyed to the grinding portion 25.

(C7) In the above-mentioned respective embodiments, the three-dimensional shaping apparatuses 100 and 100*b* include the first nozzle 65 and the second nozzle 66. On the other hand, the three-dimensional shaping apparatuses 100 and 100*b* may be configured to include only the first nozzle 65.

(C8) In the above-mentioned respective embodiments, the three-dimensional shaped article OB is produced using the three-dimensional shaping apparatus 100 or 100*b*, in which at least a part of the material is melted by the rotation of the flat screw 40 and heating by the built-in heater 58 in the barrel 50, thereby forming the shaping material, and the formed shaping material is ejected from the first nozzle 65 or the second nozzle 66 and stacked on the shaping stage 300. On the other hand, for example, the three-dimensional shaped article OB may be produced using an FDM (Fused Deposition Modeling) system in which a filament-like material is melted and stacked, or the like.

D. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to the first aspect of the present disclosure, a method for producing a three-dimensional shaped article is provided. The method for producing a three-dimensional shaped article includes acquiring first shape data for indicating a shape of the three-dimensional shaped article, and identification information for identifying the three-dimensional shaped article, generating second shape data for indicating the shape of the three-dimensional shaped article representing the identification information by an arrangement of layers having different characteristics using the first shape data and the identification information, producing the three-dimensional shaped article according to the second shape data, and transmitting the identification information and production information of the three-dimensional shaped article to a server.

According to the method for producing a three-dimensional shaped article of this aspect, from a produced three-dimensional shaped article, the identification information of the three-dimensional shaped article can be acquired, and by using the acquired identification information, various types of production information regarding the three-dimensional shaped article managed by the server can be acquired. Therefore, by using a produced three-dimensional shaped article, various types of production information regarding the three-dimensional shaped article can be identified.

(2) In the method for producing a three-dimensional shaped article of the above aspect, in the producing the three-dimensional shaped article, the three-dimensional shaped article may be produced using an apparatus including a melting portion melting a material to form a shaping material, and a first nozzle and a second nozzle having an opening shape different from the first nozzle for ejecting the shaping material supplied from the melting portion, a first layer of the three-dimensional shaped article having a first characteristic may be formed by ejecting the shaping material from the first nozzle, and a second layer of the three-dimensional shaped article having a second characteristic different from the first characteristic may be formed by ejecting the shaping material from the second nozzle.

According to the method for producing a three-dimensional shaped article of this aspect, by separately using the first nozzle and the second nozzle depending on the characteristic, the characteristics of the layers of the three-dimensional shaped article can be made different.

(3) In the method for producing a three-dimensional shaped article of the above aspect, the characteristic may include a line width of the shaping material.

According to the method for producing a three-dimensional shaped article of this aspect, by the line width of the shaping material for forming the layers of the three-dimensional shaped article, the characteristics of the layers can be made different.

(4) In the method for producing a three-dimensional shaped article of the above aspect, the characteristic may include an extending direction of the shaping material in the layer.

According to the method for producing a three-dimensional shaped article of this aspect, by the extending direction of the shaping material for forming the layers of the three-dimensional shaped article, the characteristics of the layers can be made different.

(5) In the method for producing a three-dimensional shaped article of the above aspect, first identification information may be acquired from a first three-dimensional shaped article, first production information of the first three-dimensional shaped article may be acquired using the first identification information, it may be determined whether the first three-dimensional shaped article is processed into a recycled material and reused using the first production information, and when it is determined that the first three-dimensional shaped article is processed into a recycled material and reused, the first three-dimensional shaped article may be processed into a recycled material by grinding, and a second three-dimensional shaped article may be produced using the recycled material.

According to the method for producing a three-dimensional shaped article of this aspect, it is possible to determine whether the first three-dimensional shaped article is processed into a recycled material in consideration of a deterioration state or the like of the first three-dimensional shaped article, and therefore, a recycled material of low quality can be prevented from being used in the production of the second three-dimensional shaped article.

(6) According to a second aspect of the present disclosure, a three-dimensional shaping apparatus coupled to a server is provided. The three-dimensional shaping apparatus includes a melting portion melting a material to form a shaping material, an ejection portion ejecting the shaping material supplied from the melting portion toward a stage, a moving mechanism changing a relative position of the ejection portion and the stage, a shape data generation portion generating second shape data for indicating a shape of a three-dimensional shaped article representing identification information for identifying the three-dimensional shaped article by an arrangement of layers having different characteristics using first shape data for indicating the shape of the three-dimensional shaped article, and the identification information, a controller controlling the melting portion and the moving mechanism according to the second shape data, thereby producing the three-dimensional shaped article, and a communication portion transmitting the identification information and production information of the three-dimensional shaped article to the server.

According to the three-dimensional shaping apparatus of this aspect, from a produced three-dimensional shaped article, the identification information of the three-dimensional shaped article can be acquired, and by using the acquired identification information, various types of production information regarding the three-dimensional shaped article managed by the server can be acquired. Therefore, by using a produced three-dimensional shaped article, various types of production information regarding the three-dimensional shaped article can be identified.

(7) According to a third aspect of the present disclosure, a three-dimensional shaping system including a three-dimensional shaping apparatus, a data processing apparatus, and a server is provided. In the three-dimensional shaping system, the three-dimensional shaping apparatus includes a melting portion melting a material to form a shaping material, an ejection portion ejecting the shaping material supplied from the melting portion toward a stage, a moving mechanism changing a relative position of the ejection portion and the stage, and a controller controlling the melting portion and the moving mechanism, the data processing apparatus includes a shape data generation portion generating second shape data for indicating a shape of a three-dimensional shaped article representing identification information for identifying the three-dimensional shaped article by an arrangement of layers having different characteristics using first shape data for indicating the shape of the three-dimensional shaped article, and the identification information, a shape data transmission portion transmitting the second shape data to the three-dimensional shaping apparatus, and a communication portion transmitting the identification information and production information of the three-dimensional shaped article to the server, and the controller of the three-dimensional shaping apparatus controls the melting portion and the moving mechanism according to the second shape data, thereby producing the three-dimensional shaped article.

According to the three-dimensional shaping system of this aspect, from a produced three-dimensional shaped article, the identification information of the three-dimensional shaped article can be acquired, and by using the acquired identification information, various types of production information regarding the three-dimensional shaped article managed by the server can be acquired. Therefore, by using a produced three-dimensional shaped article, various types of production information regarding the three-dimensional shaped article can be identified.

The present disclosure can also be realized in various aspects other than the three-dimensional shaping system. For example, it can be realized in aspects of a three-dimensional shaping apparatus, a method for controlling a three-dimensional shaping apparatus, a method for producing a three-dimensional shaped article, a method for recycling a three-dimensional shaped article, etc.

What is claimed is:

1. A method for producing a three-dimensional shaped article, comprising:
   acquiring first shape data for indicating a shape of the three-dimensional shaped article, and identification information for identifying the three-dimensional shaped article;
   generating second shape data for indicating the shape of the three-dimensional shaped article representing the identification information by an arrangement of layers having different characteristics using the first shape data and the identification information;
   acquiring first identification information from a first three-dimensional shaped article;
   acquiring first production information of the first three-dimensional shaped article using the first identification information;
   determining whether the first three-dimensional shaped article is processed into a recycled material and reused using the first production information;
   upon determining that the first three-dimensional shaped article is processed into a recycled material and reused, processing the first three-dimensional shaped article into a recycled material by grinding, and producing a second three-dimensional shaped article as the three-dimensional shaped article using the recycled material according to the second shape data; and
   transmitting the identification information and second production information of the second three-dimensional shaped article to a server.

2. The method for producing a three-dimensional shaped article according to claim 1, wherein
   in the producing the second three-dimensional shaped article, the second three-dimensional shaped article is produced using an apparatus including a melting portion melting the recycled material, which has been ground, to form a shaping material, and a first nozzle and a second nozzle having an opening shape different from the first nozzle for ejecting the shaping material supplied from the melting portion,
   a first layer of the second three-dimensional shaped article having a first characteristic is formed by ejecting the shaping material from the first nozzle, and
   a second layer of the second three-dimensional shaped article having a second characteristic different from the first characteristic is formed by ejecting the shaping material from the second nozzle.

3. The method for producing a three-dimensional shaped article according to claim 1, wherein
   the characteristic includes a line width of the shaping material.

4. The method for producing a three-dimensional shaped article according to claim 1, wherein the characteristic includes an extending direction of the shaping material in the layer.

* * * * *